US011914255B2

(12) United States Patent
Morinaga et al.

(10) Patent No.: US 11,914,255 B2
(45) Date of Patent: Feb. 27, 2024

(54) WIRING BOARD AND DISPLAY DEVICE

(71) Applicant: Sharp Display Technology Corporation, Kameyama (JP)

(72) Inventors: Junichi Morinaga, Kameyama (JP); Hikaru Yoshino, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 218 days.

(21) Appl. No.: 17/685,656

(22) Filed: Mar. 3, 2022

(65) Prior Publication Data

US 2022/0326583 A1 Oct. 13, 2022

(30) Foreign Application Priority Data

Apr. 7, 2021 (JP) ................................. 2021-065145

(51) Int. Cl.
*G06F 3/041* (2006.01)
*G06F 3/044* (2006.01)
*G02F 1/1362* (2006.01)
*G02F 1/1343* (2006.01)

(52) U.S. Cl.
CPC .. *G02F 1/136286* (2013.01); *G02F 1/134309* (2013.01); *G06F 3/0412* (2013.01); *G06F 3/04164* (2019.05)

(58) Field of Classification Search
None
See application file for complete search history.

(56) References Cited

U.S. PATENT DOCUMENTS

2016/0378254 A1   12/2016   Wang et al.
2019/0079620 A1*  3/2019   Yoshida ................ G02F 1/1368
2019/0318702 A1* 10/2019   Yoshida ............... G09G 3/3648

FOREIGN PATENT DOCUMENTS

JP        2018-509662 A     4/2018

* cited by examiner

*Primary Examiner* — Krishna P Neupane
(74) *Attorney, Agent, or Firm* — Keating & Bennett, LLP

(57) ABSTRACT

A wiring board includes position detection lines, position detection electrodes, a line, connection lines, and a short-circuit line. The position detection lines extend along a first direction and transmit at least position detection signals. The position detection electrodes are arranged at intervals with respect to the first direction and connected to the position detection lines. The line is disposed between the position detection electrodes that are adjacent to each other with respect to the first direction and the line extends in a second direction that crosses the first direction. The connection lines extend along the first direction and are connected to the position detection electrodes. The connection lines are arranged at intervals with respect to the second direction. The short-circuit line extends along the second direction and overlaps the line via an insulating film and is connected to the connection lines.

15 Claims, 24 Drawing Sheets

WIRING BOARD AND DISPLAY DEVICE

CROSS REFERENCE TO RELATED APPLICATION

This application claims priority from Japanese Patent Application No. 2021-65145 filed on Apr. 7, 2021. The entire contents of the priority application are incorporated herein by reference.

TECHNICAL FIELD

The present technology described herein relates to a wiring board and a display device.

BACKGROUND

A wiring board included in a display device has been known. One example of such a wiring board is an array substrate of an in-cell touch panel that is built in a display device. Such a built-in touch panel includes an array substrate including sub-pixels, gate lines and data lines that are disposed on the array substrate to cross each other and are insulated from each other, self-capacitive electrodes that are portions of a same layer and independent of each other, and touch control lines that connect the self-capacitive electrodes to the touch detection chip. The gate lines and the data lines cross each other to define the sub-pixels. Each of the sub-pixels has a long side and a short side and includes a pixel electrode. The touch lines extend along the short-side direction of the sub-pixels. Such a built-in touch panel is designed with a new pixel structure and the position of each touch control line is optimized and an aperture ratio is increased and power consumption is reduced.

Such a built-in touch panel includes metal lines that are included in a same layer as the layer of the touch control line and are insulated from each other. The metal lines are electrically connected to the self-capacitive electrodes via the via holes. This lowers an electrical resistance of the self-capacitive electrodes having a high electrical resistance value. To decrease resistance variation of the self-capacitive electrodes in the electrical resistance distribution, it is preferable to increase the number of connection points between the metal lines and the self-capacitive electrodes, that is, the number of via holes. However, the increased number of via holes may deteriorate display quality. To suppress the deterioration of display quality, light is necessarily blocked from leaking through surrounding sections of the via holes. This may decrease the aperture ratio of the pixels.

Some of the gate lines of the array substrate included in the built-in touch panel are arranged between the self-capacitive electrodes that are arranged at intervals. Unlike the gate lines that are overlapped with the self-capacitive electrodes, an electric field that is created between such gate lines and the pixel electrode is less likely to be blocked. Therefore, display quality may be deteriorated by the electric field. To suppress the deterioration of display quality, light is necessarily blocked from leaking through surrounding sections of the gate lines that are arranged between the self-capacitive electrodes. This may decrease the aperture ratio of the pixels.

SUMMARY

The technology described herein was made in view of the above circumstances. An object is to decrease a resistance variation in an electrical resistance distribution of a position detection electrode and block an electric field that is created relative to lines.

A wiring board according to the technology described herein includes position detection lines extending along a first direction and transmitting at least position detection signals, position detection electrodes arranged at intervals with respect to the first direction and connected to the position detection lines, a line disposed between the position detection electrodes that are adjacent to each other with respect to the first direction, the line extending in a second direction that crosses the first direction, connection lines extending along the first direction and connected to the position detection electrodes, the connection lines being arranged at intervals with respect to the second direction, and a short-circuit line extending along the second direction and overlapping the line via an insulating film and connected to the connection lines.

According to the technology described herein, resistance variation in an electrical resistance distribution of a position detection electrode can be decreased and an electric field that is created relative to lines can be blocked.

DETAILED DESCRIPTION

First Embodiment

Figure 1:
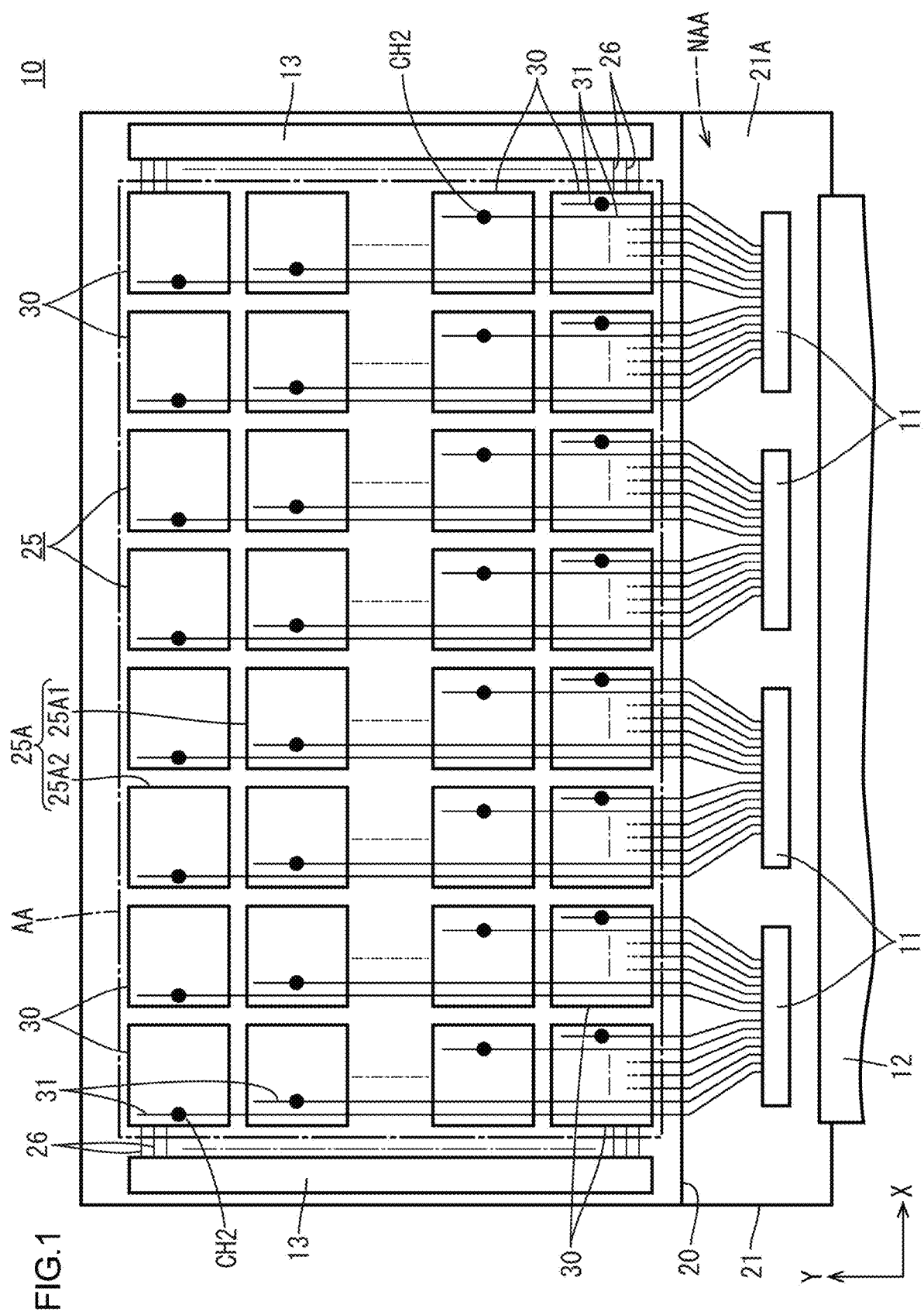
FIG. 1 is a plan view illustrating touch electrodes and touch lines of a liquid crystal panel according to a first embodiment.

A first embodiment will be described with reference to FIGS. 1 to 18. In this embodiment section, a liquid crystal panel 10 (a display device) with an image display function and a touch panel function (a position input function, a position detection function) will be described. X-axes, Y-axes, and Z-axes may be present in the drawings. The axes in each drawing correspond to the respective axes in other drawings. An upper side and a lower side in FIGS. 4, 5, 12, 13, and 16 correspond to a front side and a back side of the liquid crystal panel 10, respectively.

FIG. 1 is a schematic plan view of the liquid crystal panel 10. As illustrated in FIG. 1, the liquid crystal panel 10 has a laterally long rectangular plan view shape as a whole. In the liquid crystal panel 10, a short-side direction, a long-side direction, and a plate thickness direction correspond to the Y-axis direction, the X-axis direction, and the Z-axis direction, respectively. The liquid crystal panel 10 is configured to display images with using light that is illuminated by a backlight unit (a lighting device) that is disposed behind the liquid crystal panel 10. The backlight unit is disposed behind (on a back surface side of) the liquid crystal panel 10. The backlight unit includes light sources configured to emit white light (e.g., LEDs) and optical members for converting the light from the light sources into planar light by applying optical effects to the light from the light sources.

As illustrated in FIG. 1, a middle section of a screen of the liquid crystal panel 10 is configured as a display area AA in which images are displayed (an area defined by a chain line in FIG. 1). An outer section in a frame shape surrounding the display area AA in the screen of the liquid crystal panel 10 is configured as a non-display area NAA in which the images are not displayed. The liquid crystal panel 10 includes a pair of substrates 20, 21 that are bonded to each other. One of the substrates on the front side (a front surface side) is a CF substrate 20 (an opposed substrate) and another one on the back side (a back surface side) is an array substrate 21 (a wiring board, an active matrix substrate). The CF substrate 20 and the array substrate 21 include substantially transparent glass substrates and various films formed in layers on the glass substrates. Polarizing plates are attached to outer surfaces of the substrates 20 and 21.

As illustrated in FIG. 1, the CF substrate 20 has a short-side dimension that is smaller than a short-side dimension of the array substrate 21. The CF substrate 20 is bonded to the array substrate 21 such that one of the long sides of the CF substrate 20 is aligned with a corresponding one of the long sides of the array substrate 21. Therefore, a long side edge section including another one of the long sides of the array substrate 21 projects from another one of the long sides of the CF substrate 20. The long side edge section of the array substrate 21 including another one of the long sides of the array substrate 21 is a CF substrate non-overlapping section 21A that does not overlap the CF substrate 20. Drivers 11 (a signal supply section) and a flexible substrate 12 that are components for supplying various signals related to a display function and a touch panel function are mounted on the CF substrate non-overlapping section 21A. The driver 11 is an LSI chip including a driver circuit therein and mounted on the CF substrate non-overlapping section 21A of the array substrate 21 through the chip-on-glass (COG) technology. The driver 11 processes the signals transmitted via the flexible substrate 12. The flexible substrate 12 includes a synthetic resin substrate (e.g., polyimide-based resin substrate) having insulating property and flexibility and multiple traces (not illustrated) formed on the substrate. A first end of the flexible substrate 12 is connected to the array substrate 21 and a second end of the flexible substrate 12 is connected to a control circuit board (a signal source). The signals from the control circuit board are transmitted to the liquid crystal panel 10 via the flexible substrate 12. A pair of gate circuits 13 is disposed in the non-display area NAA of the array substrate 21 so as to sandwich the display area AA with respect to the X-axis direction. The gate circuits 13 are for supplying scan signals to gate lines 26, which will be described later, and are monolithically fabricated on the array substrate 21.

The liquid crystal panel 10 according to this embodiment has a display function for displaying images and a touch panel function for detecting positions of input performed by a user based on displayed images (input positions). The liquid crystal panel 10 includes an integrated touch panel pattern (with an in-cell technology) for exerting the touch panel function. The touch panel pattern uses so-called a projection type electrostatic capacitance method. A self-capacitance method is used for detection. As illustrated in FIG. 1, the touch panel pattern includes touch electrodes 30 (position detection electrodes) that are arranged in a matrix within the plate surface of the liquid crystal panel 10. The touch electrodes 30 are disposed in the display area AA of the liquid crystal panel 10. The display area AA of the liquid crystal panel 10 substantially corresponds to a touch area in which input positions are detectable (a position input area). The non-display area NAA substantially corresponds to a non-touch area in which input positions are not detectable (a non-position input area). When the user intends to input a position based on a displayed image that is displayed in the display area AA of the liquid crystal panel 10 and recognized by the user and the user brings a position input body to the surface of the liquid crystal panel 10 (a display surface), the position input body and the touch electrode 30 form a capacitor. Examples of the position input body include the user's finger, which is a conductive member, and a touch pen that is used by the user. A capacitance measured at the touch electrode 30 close to the position input body changes as the position input body approaches the touch electrode 30 and is different from a capacitance at the touch electrodes 30 farther from the position input body. Based on the difference in capacitance, the input position can be detected.

As illustrated in FIG. 1, the touch electrodes 30 are arranged in the X-axis direction (a second direction) and the Y-axis direction (a first direction) within the display area AA at intervals. For example, eighty touch electrodes 30 are arranged in the X-axis direction and fifty touch electrodes 30 arranged in the Y-axis direction. A touch electrode row includes the touch electrodes 30 that are arranged in the X-axis direction and a touch electrode column (a column of position detection electrodes) includes the touch electrodes that are arranged in the Y-axis direction. The drivers 11 are arranged on a long edge section of the array substrate 21 that is on one-end side of the touch electrode columns with respect to the Y-axis direction. Each of the touch electrodes 30 has a rectangular shape in the plan view with edges in some millimeters. The touch electrodes 30 are significantly larger than pixels PX, which will be described later, in the plan view. Namely, each touch electrode 30 is disposed in an area that straddles more than one pixel PX in the X-axis direction and the Y-axis direction (e.g., tens of or millions of the pixels PX). The specific dimension of each edge of the touch electrode 30 and the specific number of touch electrodes 30 within the touch area can be altered from the above-described ones where appropriate. A specific configuration of the touch electrode 30 will be further described later.

As illustrated in FIG. 1, touch lines 31 (position detection lines) on the liquid crystal panel 10 are selectively connected to the touch electrodes 30. The touch lines 31 extend substantially along the Y-axis direction. One ends of the touch lines 31 are connected to the driver 11 in the non-display area NAA and another ends are connected to the specific touch electrodes 30 among the touch electrodes 30 arranged in the Y-axis direction in the display area AA. In FIG. 1, connection points (touch line contact holes CH2) of the touch electrodes and the touch lines 31 are indicated by large black points. The touch lines 31 are connected to a detection circuit. The detection circuit may be included in the driver 11 or provided outside the liquid crystal panel 10 via the flexible substrate 12. A specific configuration of the touch lines 31 will be described later.

Figure 2:
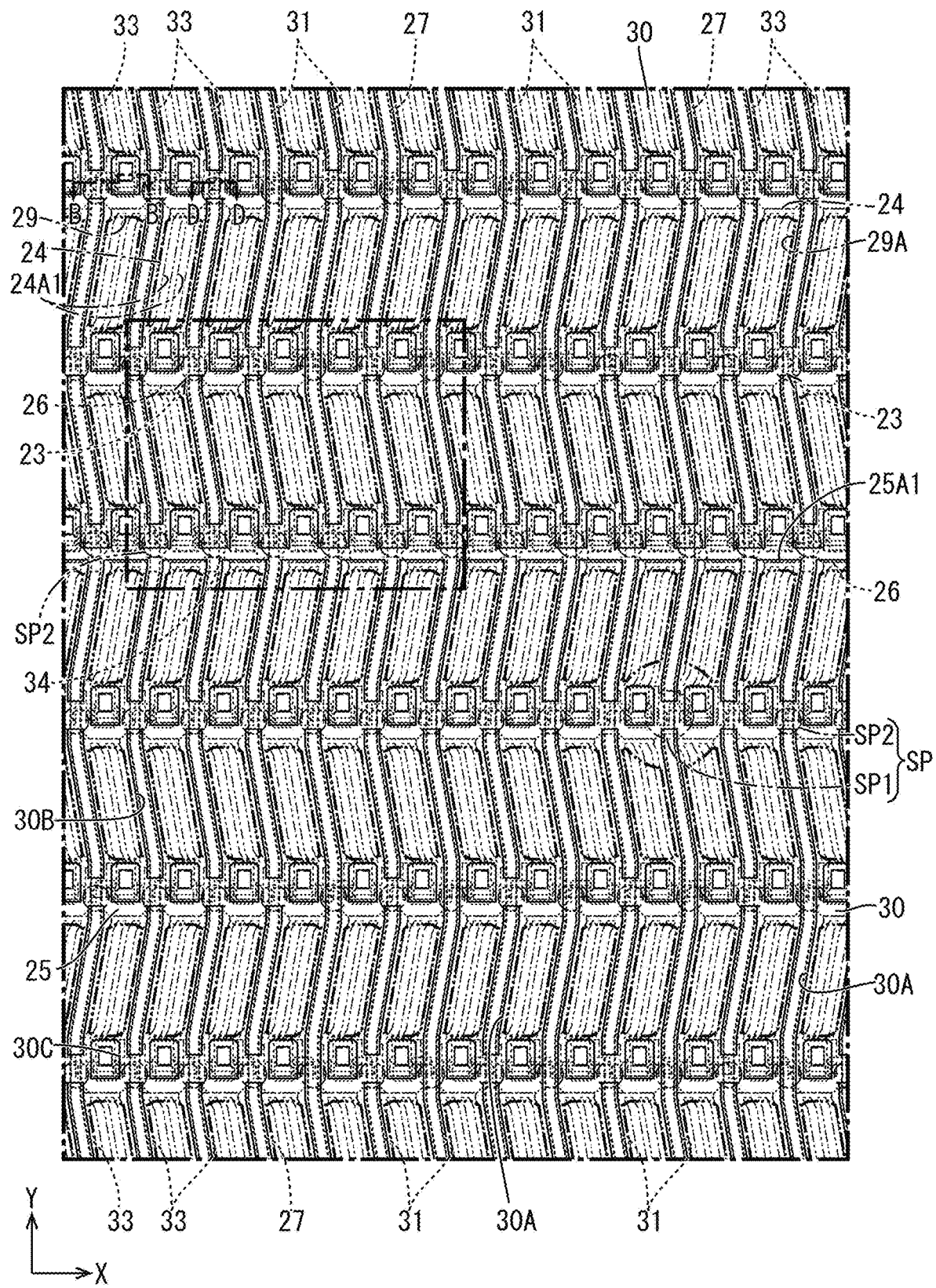
FIG. 2 is a plan view illustrating a portion of an array substrate near first dividing openings in a common electrode included in the array substrate of the liquid crystal panel.
Figure 3:
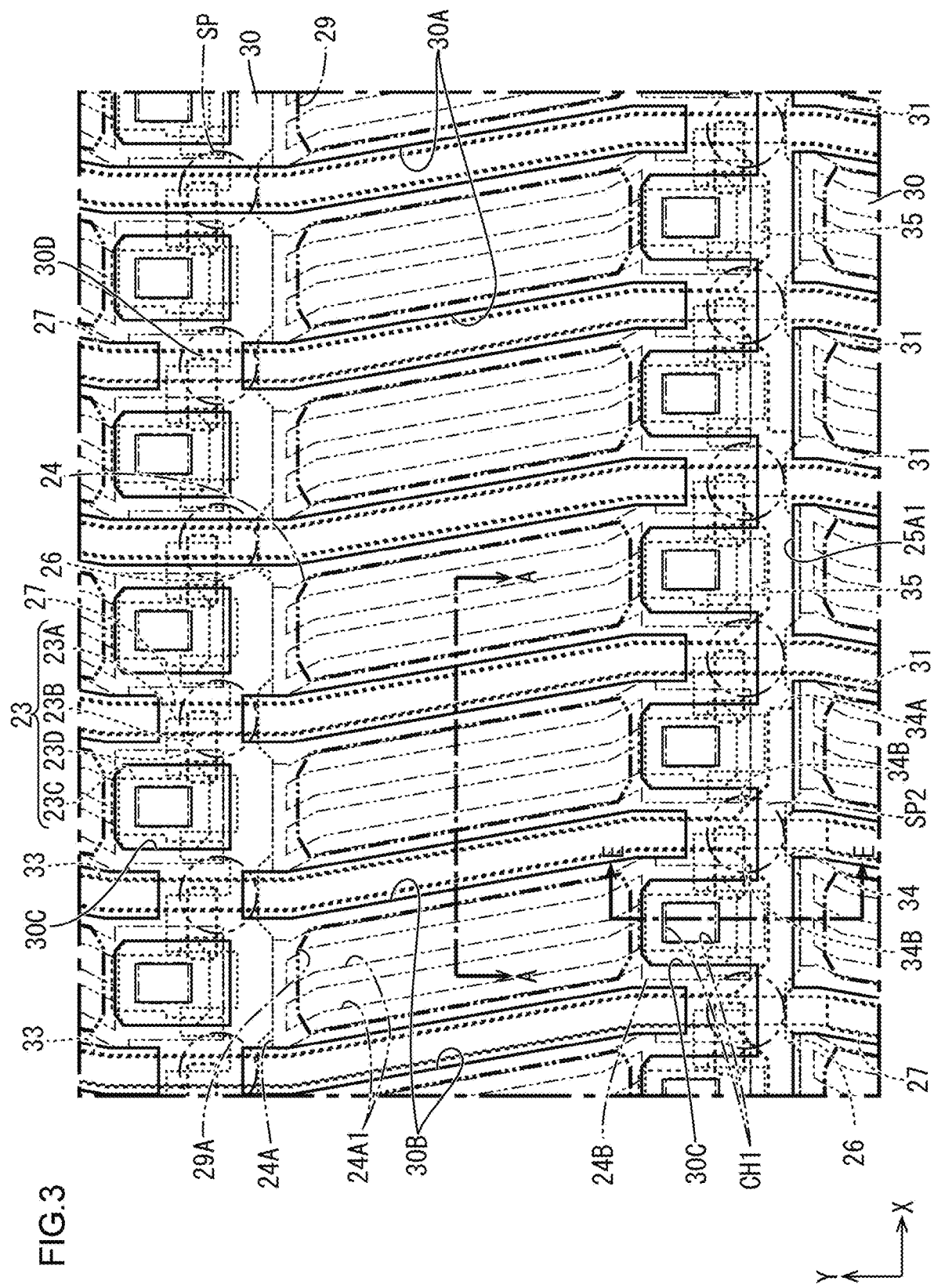
FIG. 3 is a magnified plan view illustrating a portion of the array substrate near the first dividing opening in the common electrode.

FIG. 2 is a plan view illustrating the display area AA of the array substrate 21 of the liquid crystal panel 10 and illustrating a portion of the display area near a first dividing opening 25A1. FIG. 3 is a magnified plan view illustrating a portion (the portion of the display area near the first dividing opening 25A1) surrounded by a chain line in FIG. 2. As illustrated in FIGS. 2 and 3, thin film transistors (TFTs) 23 (switching components) and pixel electrodes 24 are arranged in an area of an inner surface of the array substrate 21 in the display area AA. The TFTs 23 and the pixel electrodes 24 are arranged at intervals in a matrix along the X-axis direction and the Y-axis direction. The pixel electrode 24 is included in the pixel PX that is a unit for display. Gate lines 26 (lines, scanning lines) and source lines 27 (first lines, image lines) are routed perpendicular to each other (with crossing) to surround the TFTs 23 and the pixel electrodes 24. The gate lines 26 extend substantially straight in a direction substantially along the X-axis direction with changing a line width thereof. The source lines 27 extend in a direction substantially along the Y-axis direction with being curved in a zig-zag form. The gate lines 26 are connected to gate electrodes 23A of the TFTs 23 that are arranged in the X-axis direction. The gate lines 26 are arranged at intervals in the Y-axis direction. The source lines 27 are connected to source electrodes 23B of the TFTs 23 that are arranged in the Y-axis direction. The source lines 27 are arranged at intervals in the X-axis direction. The TFTs 23 are driven based on signals supplied to the gate lines 26 and the source lines 27. Through the driving of the TFTs 23, application of potentials to the pixel electrodes 24 that are connected to drain electrodes 23C of the TFTs 23 is controlled. With reference to FIGS. 2 and 3, the TFT 23 is arranged on the left side of the relevant source line 27 that is connected to the relevant TFT 23 and on the lower side of the relevant pixel electrode 24 that is connected to the TFT 23.

As illustrated in FIGS. 2 and 3, the light blocking portion 29 (an inter-pixel light blocking portion, a black matrix), which is indicated by a thick two-dot chain line, is included in the CF substrate 20. In FIGS. 2 and 3, the pixel electrodes 24 are indicated by thin two-dot chain lines. As illustrated in FIGS. 2 and 3, the light blocking portion 29 is formed in a grid pattern in a plan view to separate the adjacent pixel electrodes 24. The light blocking portion 29 includes pixel openings 29A at positions overlapping large areas of the pixel electrodes 24. The pixel openings 29A pass light therethrough for display at the pixel electrodes 24 and allow the light to exit outside the liquid crystal panel 10. The light blocking portion 29 overlaps at least the gate lines 26 and the source lines 27 (including the touch lines 31) included in the array substrate 21 in a plan view. Spacers SP are disposed between the substrates 20, 21 so as to overlap intersections of the gate lines 26 and the source lines 27 and keep a gap between the substrates 20, 21. In FIGS. 2 and 3, the spacers SP are indicated by thick two-dot chain lines that are thicker than those for the pixel electrodes 24. The spacers SP includes main spacers SP1 and sub spacers SP2 that have a plan view area smaller than that of the main spacers SP1. The main spacers SP1 are arranged at intervals in the X-axis direction and the Y-axis direction and each of the intervals between the main spacers SP1 in the X-axis direction and the Y-axis direction is same as a total dimension of multiple pixels PX (about several dozen pixels PX). The sub spacers SP2 are arranged at intervals in the X-axis direction and the Y-axis direction and each of the intervals between the sub spacers SP2 is same as a dimension of one pixel PX.

Figure 4:
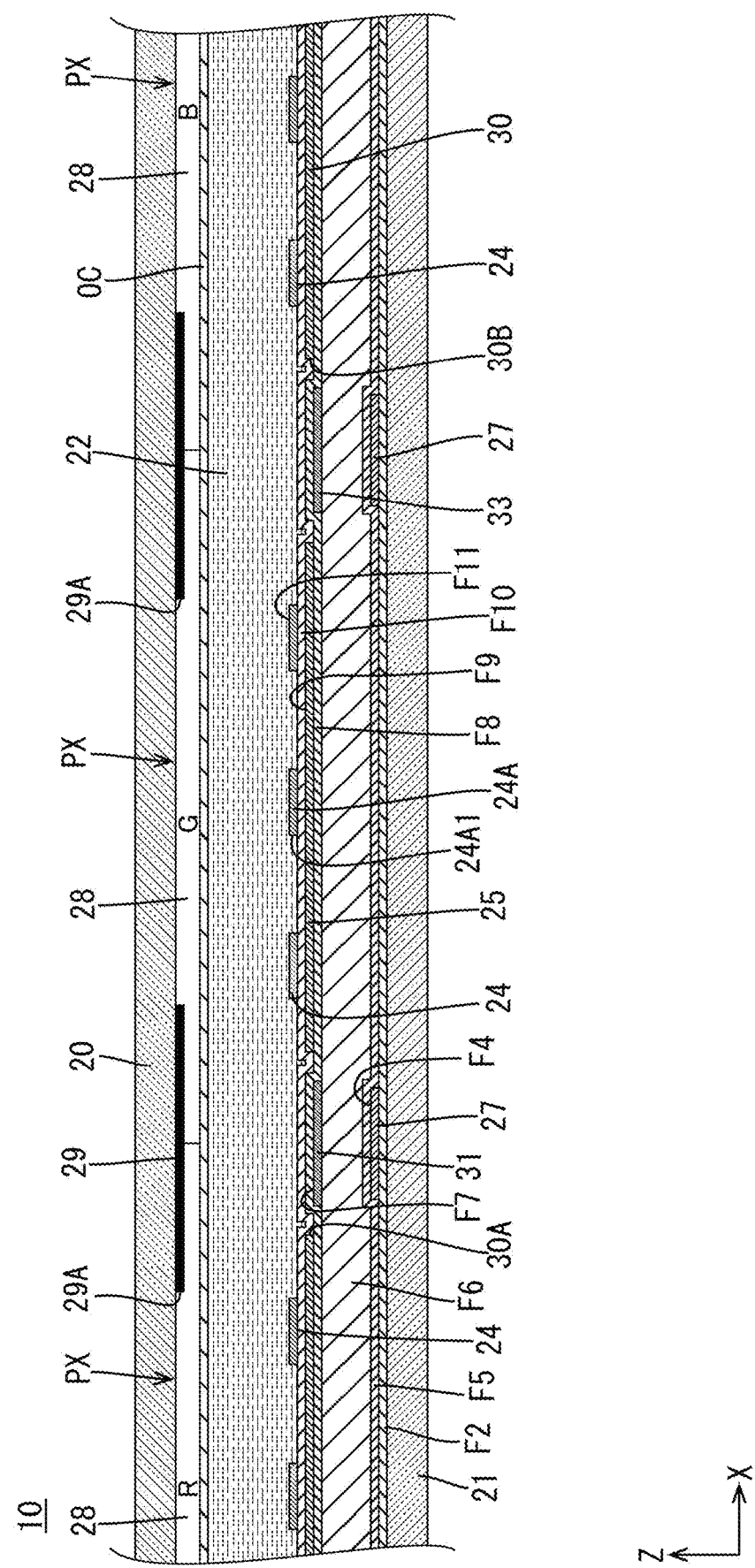
FIG. 4 is a cross-sectional view of the liquid crystal panel along line A-A in FIG. 3.

FIG. 4 is a cross-sectional view (along A-A line in FIG. 3) of a middle section of the pixel PX of the liquid crystal panel 10. As illustrated in FIG. 4, the liquid crystal panel 10 includes a liquid crystal layer 22 (a medium layer) between the substrates 20 and 21. The liquid crystal layer 22 includes liquid crystal molecules having optical characteristics that vary according to application of electric field. Color filters 28 that exhibit three different colors of red (R), green (G), and blue (B) are disposed in the display area AA on the inner surface side of the CF substrate 20 of the liquid crystal panel 10. The color filters 28 that exhibit different colors are repeatedly arranged along the gate lines 26 (in the X-axis direction) and the color filters 28 are arranged in lines along the source lines 27 (substantially the Y-axis direction). Namely, the color filters 28 are arranged in a stripe as a whole. The color filters 28 are arranged to overlap the pixel electrodes 24 of the array substrate 21, respectively, in a plan view. The color filters 28 that are adjacent to each other in the X-axis direction and exhibit different colors each other are arranged such that a boundary therebetween (a color boundary) overlaps the source line 27 (including the touch lines 31) and the light blocking portion 29. In the liquid crystal panel 10, the R, the G, and the B color filters 28 that are arranged along the X-axis direction and three pixel electrodes 24 opposed to the respective color filters 28 compose three colors of pixels PX. In the liquid crystal panel 10, the R, the G, and the B pixels PX that are adjacent to one another in the X-axis direction form a display pixel and the display pixels are configured to perform color display in predefined tones. An interval of the pixels PX in the Y-axis direction is about three times of the interval between the pixels PX in the X-axis direction. The light blocking portion 29 is disposed to define each of the adjacent color filters 28. An overcoat film OC is disposed in a solid manner on a substantially entire area of the CF substrate 20 for planarization. Alignment films for orienting the liquid crystal molecules in the liquid crystal layer 22 are formed on innermost surfaces of the substrates 20 and 21 in contact with the liquid crystal layer 22.

Next, a common electrode 25 will be described with reference to FIGS. 3 and 4. As illustrated in FIGS. 3 and 4, the common electrode 25 is formed to overlap all the pixel electrodes 24 in a layer lower than the pixel electrodes 24 in the display area AA on an inner surface side of the array substrate 21. The common electrode 25 spreads over substantially an entire area of the display area AA and is supplied with a common potential signal (a reference potential signal) of a common potential (a reference potential) except for a period (a sensing period) while a touch signal (a position detection signal) being supplied and detecting an input position input by a position inputter. When a potential difference occurs between the pixel electrode 24 and the common electrode 25 that overlap each other as the pixel electrode 24 is charged, a fringe electric field (an oblique electric field) is created between an opening edge of a slit 24A1 of the pixel electrode 24 and the common electrode 25. With the fringe electric field, orientations of the liquid crystal molecules included in the liquid crystal layer 22 can be controlled. Namely, the liquid crystal panel 10 according to this embodiment operates in the fringe field switching (FFS) mode.

As illustrated in FIG. 1, the touch electrodes 30 are portions of the common electrode 25. The common electrode 25 includes the dividing openings 25A (dividing slits) for separating the adjacent touch electrodes 30 from each other. The dividing openings 25A include first dividing openings 25A1 that cross the common electrode 25 in the X-axis direction for an entire length of the common electrode 25 and second dividing openings 25A2 that cross the common electrode 25 in the Y-axis direction for an entire length of the common electrode 25. The dividing openings 25A are formed in a grid in a plan view as a whole. The common electrode 25 is divided into the touch electrodes 30 with a grid pattern in a plan view by the dividing openings 25A and includes the touch electrodes 30 that are electrically independent from one another. The touch electrodes 30 that are arranged along the Y-axis direction are separated by the first dividing openings 25A1 and the touch electrodes 30 that are arranged along the X-axis direction are separated by the second dividing openings 25A2. The touch lines 31 that are connected to the touch electrodes 30 are supplied with common potential signals for the display function and touch signals for the touch function (position detection signals) from the driver 11 at different timing. A period while the touch lines 31 are supplied with the common potential signals from the driver 11 is a display period and a period while the touch lines 31 are supplied with the touch signals from the driver 11 is a sensing period (a position detection period). The common potential signals are transmitted to all the touch lines 31 at the same timing (for the display period) and thus all the touch electrodes 30 have the reference potential based on the common potential signals and function as the common electrode 25.

Figure 5:
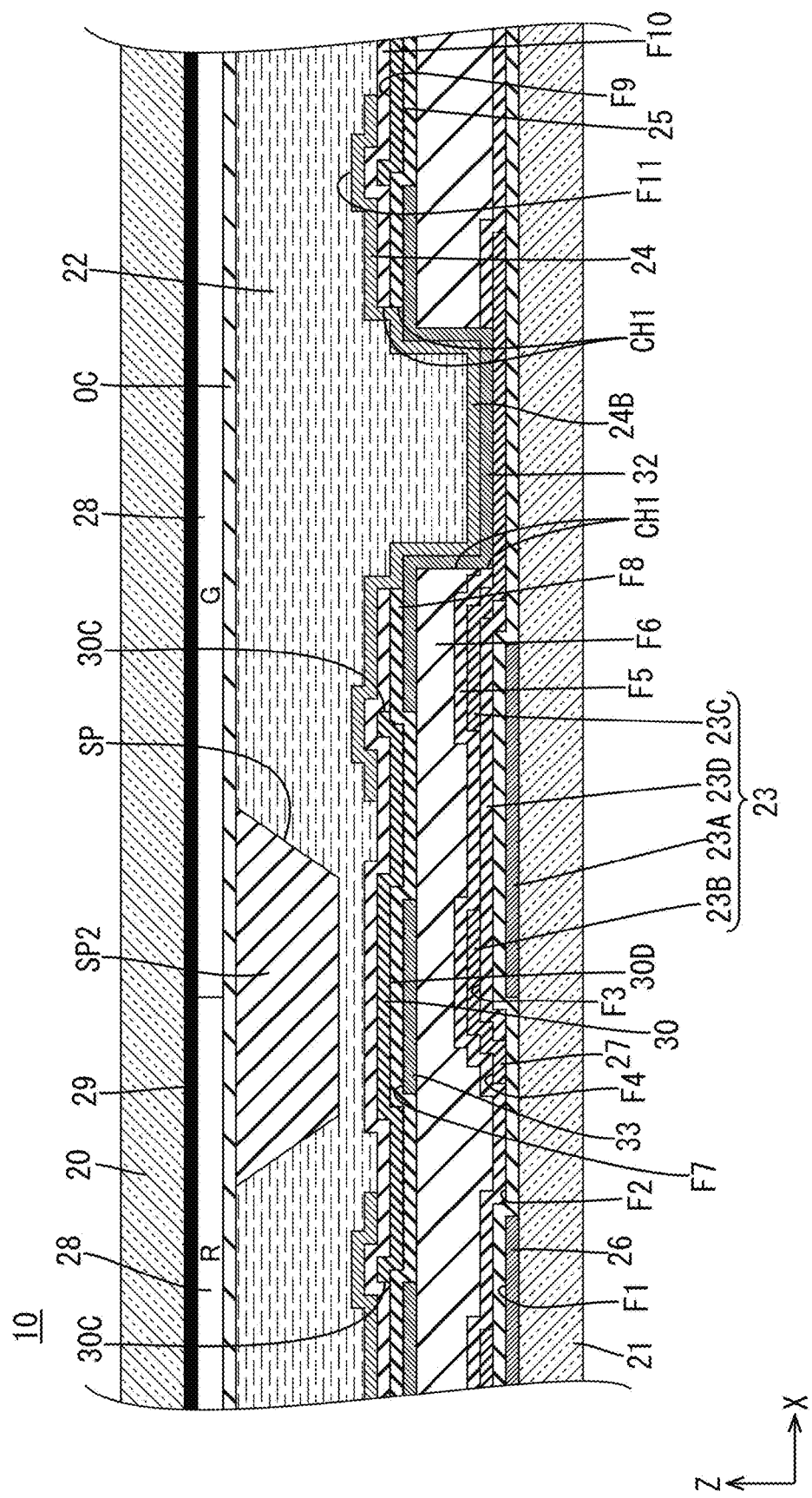
FIG. 5 is a cross-sectional view of the liquid crystal panel along line B-B in FIG. 3.

Films disposed on top of each other on the inner surface side of the array substrate 21 will be described with reference to FIG. 5. FIG. 5 is a cross-sectional view (along line B-B in FIG. 2) illustrating a section of the liquid crystal panel 10 near the TFT 23. As illustrated in FIG. 5, a first metal film F1, a gate insulating film F2, a semiconductor film F3, a second metal film F4, a first interlayer insulating film F5, a planarization film F6, a third metal film F7 (a conductive film), a second interlayer insulating film F8, a first transparent electrode film F9, a third interlayer insulating film F10, a second transparent electrode film F11 (a conductive film) are stacked on each other an inner surface side of the array substrate 21 in this sequence from a lower layer (from the glass substrate). The first metal film F1, the second metal film F4, and the third metal film F7 may be a single-layer film made of one kind of metal, a multilayer film made of a material containing different kinds of metals, or an alloy. Examples of the metals include copper, titanium, aluminum, molybdenum, and tungsten. The first metal film F1, the second metal film F4, and the third metal film F7 have conductivity and light blocking properties. The gate lines 26 and the gate electrodes 23A of the TFTs 23 are portions of the first metal film F1. The source lines 27, the source electrodes 23B and the drain electrodes 23C of the TFTs 23 are portions of the second metal film F4. The touch lines 31 are portions of the third metal film F7. The semiconductor film F3 is a thin film made of an oxide semiconductor material or amorphous silicon. Channels 23D in the TFTs 23 are portions of the semiconductor film F3. The first transparent electrode film F9 and the second transparent electrode film F11 are made of a transparent electrode material (e.g., indiumtin oxide (ITO) and indium zinc oxide (IZO)). The common electrode 25 (the touch electrodes 30) are portions of the first transparent electrode film F9. The pixel electrodes 24 are portions of the second transparent electrode film F11.

The gate insulating film F2, the first interlayer insulating film F5, the second interlayer insulating film F8, and the third interlayer insulating film F10 are made of an inorganic material such as silicon nitride ($SiN_x$) and silicon oxide ($SiO_2$). The planarization film F6 is made of an organic material such as PMMA (acrylic resin) and is thicker than other insulating films F2, F5, F8, F10 that are made of the inorganic material as illustrated in FIG. 5. The planarization film F6 planarizes the surface of the array substrate 21. The gate insulating film F2 insulates the first metal film F1 in the lower layer from the semiconductor film F3 and the second metal film F4 in the upper layer. The first interlayer insulating film F5 and the planarization film F6 insulate the semiconductor film F3 and the second metal film F4 in the lower layer from the third metal film F7 in the upper layer. The first interlayer insulating film F5, the planarization film F6, the second interlayer insulating film F8, and the third interlayer insulating film F10 include pixel contact holes CH1 at positions at which the drain electrodes 23C, which are portions of the second metal film F4, overlap portions of the pixel electrodes 24 (contact portions 24B), which are portions of the first transparent electrode film F9. Therefore, the drain electrodes 23C are connected to the pixel electrodes 24 via the pixel contact holes CH1. Intermediate electrodes 32 are provided to overlap the pixel contact holes CH1 in a plan view. The intermediate electrodes 32 are portions of the third metal film F7, which is between the second metal film F4 and the second transparent electrode film F11. The drain electrodes 23C are connected to the portions of the pixel electrodes 24, respectively, via the intermediate electrodes 32. The second interlayer insulating film F8 insulates the third metal film F7 in the lower layer from the first transparent electrode film F9 in the upper layer. The third interlayer insulating film F10 insulates the first transparent electrode film F9 in the lower layer from the second transparent electrode film F11 in the upper layer.

An inner surface-side configuration of the CF substrate 20 will be described with reference to FIG. 5. As illustrated in FIG. 5, the spacer SP protrudes from the inner surface of the overcoat film OC in the CF substrate 20. The spacer SP is a circular post (a columnar shape) that is tapered and protrudes toward the array substrate 21. FIG. 5 illustrates the sub spacer SP2 as an example of the spacers SP. The sub spacer SP2 has a protrusion dimension that is smaller than a thickness of the liquid crystal layer 22 and a protrusion end surface of the sub spacer SP2 is not contacted with the component of the array substrate 21. The sub spacer SP2 comes in contact with the component of the array substrate 21 when an external force is applied to the liquid crystal panel 10 and the gap between the substrates 20 and 21 is forced to be decreased. The main spacer SP1 (indicated by with two-dotted chain line in FIG. 2) has a protrusion dimension that is about same as the thickness of the liquid crystal layer 22. Therefore, the main spacer SP1 is always contacted with the component of the array substrate 21.

Figure 6:
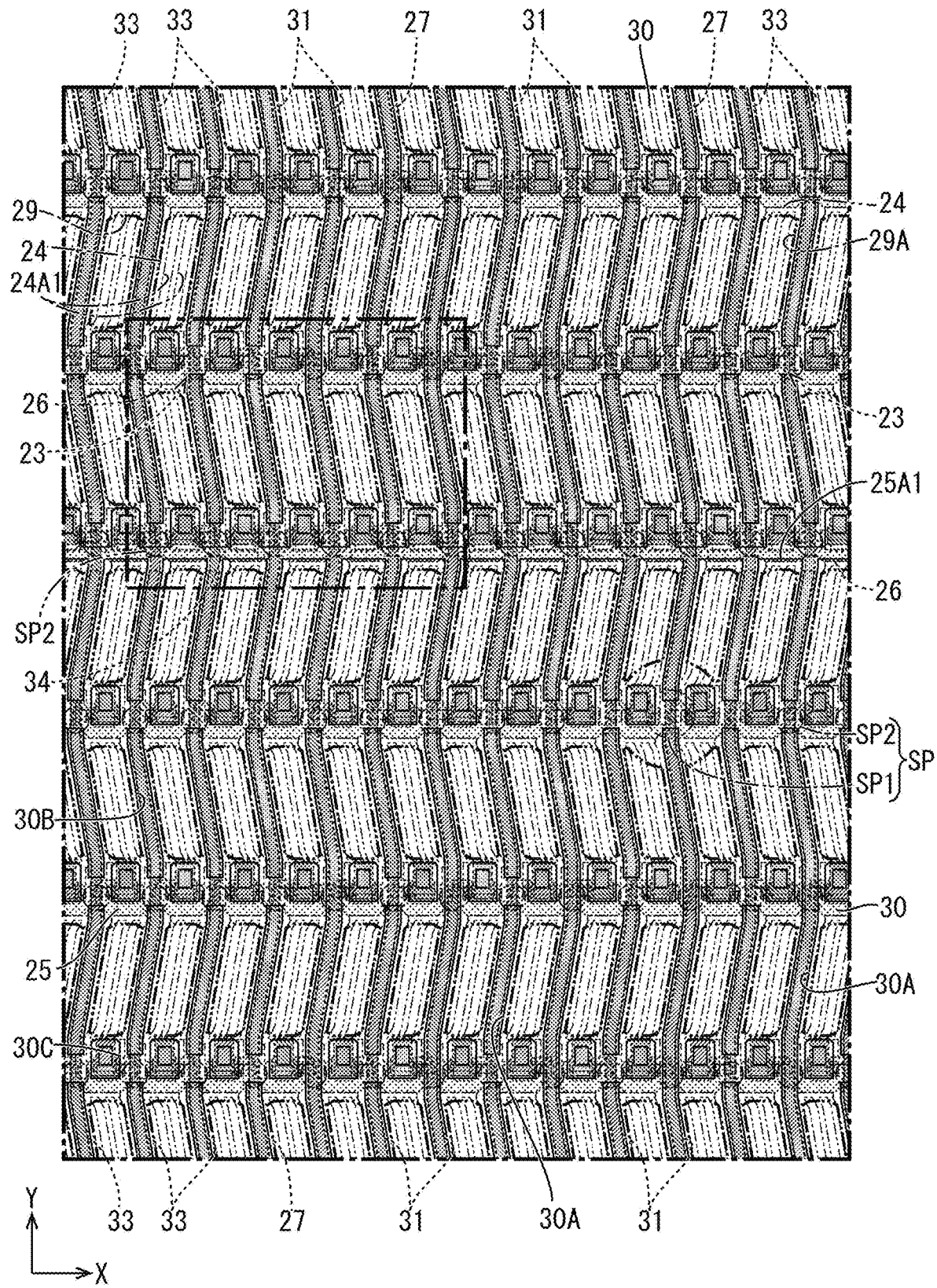
FIG. 6 is a plan view illustrating a portion of the array substrate with patterns of a first metal film and a second metal film.
Figure 7:
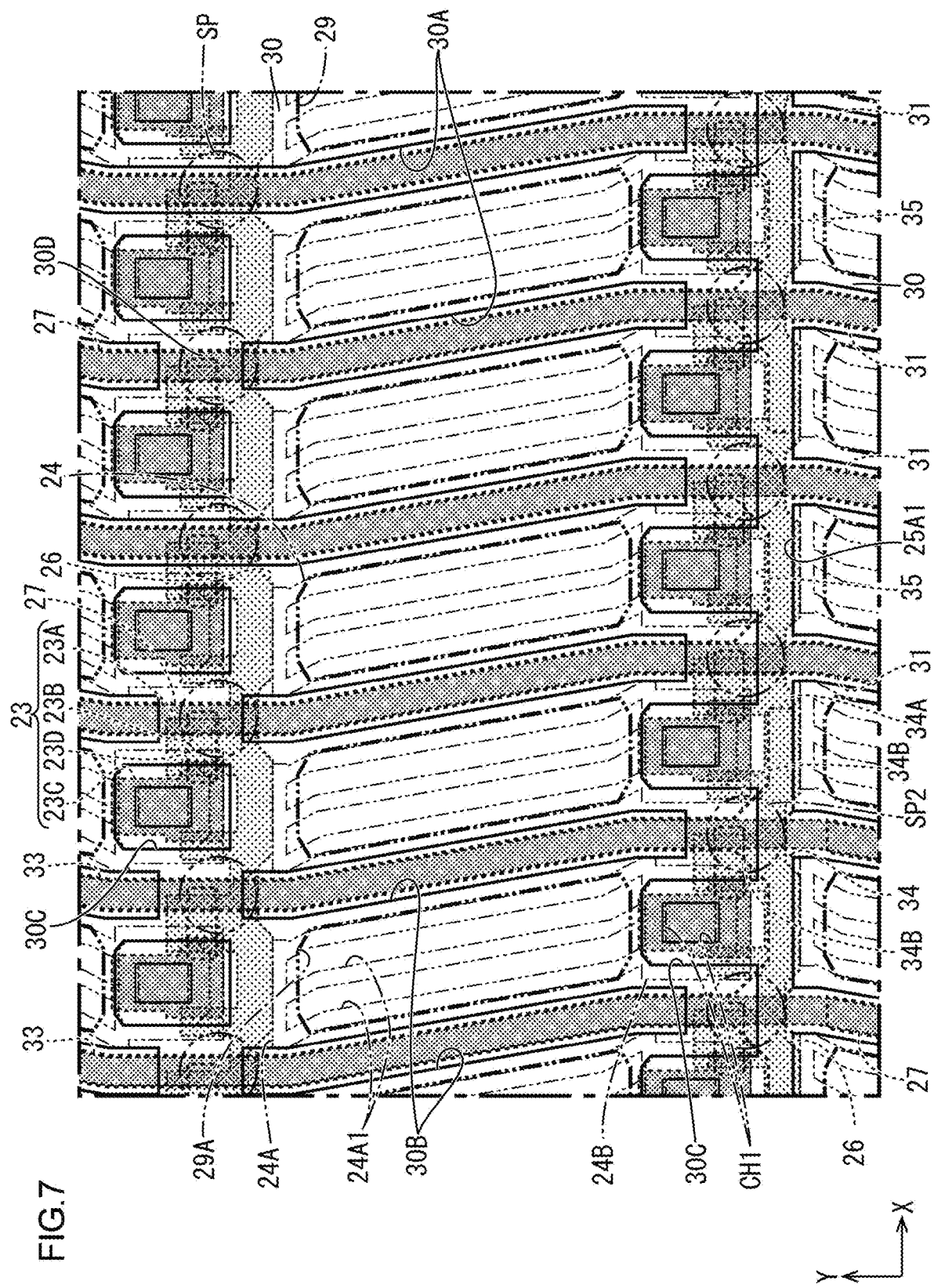
FIG. 7 is a plan view illustrating a portion of the array substrate with patterns of the first metal film and the second metal film.

A configuration of the TFTs 23 will be described with reference to FIGS. 5 to 7. FIGS. 6 and 7 are plan views illustrating patterns of the first metal film F1 (such as the gate lines 26) and the second metal film F4 (such as the source lines 27) included in the array substrate 21, although the scale and the positions differ between FIG. 6 and FIG. 7. The first metal film F1 and the second metal film F4 are illustrated with different types of shadings in FIGS. 6 and 7. As illustrated in FIGS. 6 and 7, the TFTs 23 have a laterally elongated shape as a whole extending along the X-axis direction. The TFTs 23 include the gate electrodes 23A that branch off from the gate lines 26. The gate electrodes 23A project from sections of the gate lines 26 crossing the source lines 27. The gate electrodes 23A are wide sections of the gate lines 26. The gate electrodes 23A are provided for driving the TFTs 23 based on the scan signals supplied to the gate lines 26 to control currents between the source electrodes 23B and the drain electrodes 23C. The TFTs 23 include the source electrodes 23B that are sections of the source lines 27 (crossing the gate lines 26). The source electrodes 23B are at one ends of the TFTs 23 with respect to the X-axis direction. Almost entire area of each source electrode 23B overlaps a portion of each gate electrode 23A and thus the source electrodes 23B are connected to the channels 23D. The TFTs 23 include the drain electrodes 23C disposed at distances from the source electrodes 23B. Namely, the drain electrodes 23C are at another ends of the TFTs 23 with respect to the X-axis direction. The drain electrodes 23C overlap portions of the gate electrodes 23A and connected to the channels 23D and connected to the pixel electrodes 24.

As illustrated in FIGS. 5 and 7, the TFTs 23 include the channels 23D (semiconductor sections) that overlap the gate electrodes 23A via the gate insulating film F2 and are connected to the source electrodes 23B and the drain electrodes 23C. The channels 23D extend in the X-axis direction and overlap portions of the gate electrodes 23A. First ends and second ends of the channels 23D are connected to the source electrodes 23B and the drain electrodes 23C, respectively. When the TFTs 23 turn on based on the scan signals supplied to the gate electrodes 23A, image signals (data signals) supplied to the source lines 27 are transmitted from the source electrodes 23B to the drain electrodes 23C via the channels 23D, which are portions of the semiconductor film F3. As a result, the pixel electrodes 24 are charged at potentials based on the image signals.

As illustrated in FIG. 7, the pixel electrodes 24 are arranged in vertically elongated rectangular areas that are defined and surrounded by the gate lines 26 and the source lines 27. The pixel electrodes 24 include pixel electrode bodies 24A each of which has a vertically elongated parallelogram shape in a plan view. The pixel electrodes 24 have long sides extending along the source lines 27. The long edges of the pixel electrodes extend in a direction parallel to the source lines 27. Specifically, the long edges of the pixel electrode bodies 24A extend diagonally with respect to the Y-axis direction. Each of the pixel electrode bodies 24A includes the slits 24A1 (two slits 24A1 in FIG. 7) that extend along the long edges thereof (substantially the Y-axis direction). The specific number, the specific shape, and the specific forming area of the slits 24A1 may be altered from the configuration in the drawings where appropriate. The pixel electrodes 24 include contact portions 24B that project from the pixel electrode bodies 24A in the Y-axis direction. The contact portions 24B project downward from the pixel electrode bodies 24A in FIG. 7 and overlap portions of the intermediate electrodes 32 and the drain electrodes 23C. The intermediate electrode 32 that overlaps the contact portion 24B has an island shape that is slightly greater than the pixel contact hole CH1. As illustrated in FIG. 5, the contact portions 24B are directly connected to the intermediate electrodes 32 via the pixel contact holes Ch1 and connected to the drain electrodes 23C via the intermediate electrodes 32. As illustrated in FIG. 7, the gate lines 26 include projection portions that overlap opposite ends (left ends in FIG. 7) from the channel 23D side ends of the drain electrodes 23C with respect to the X-axis direction. The projection portions are provided such that capacitances between the gate lines 26 and the drain electrodes 23C (the pixel electrodes 24) do not change even if the drain electrodes 23C are displaced from the gate lines 26 at the time of producing the array substrate 21.

Figure 8:
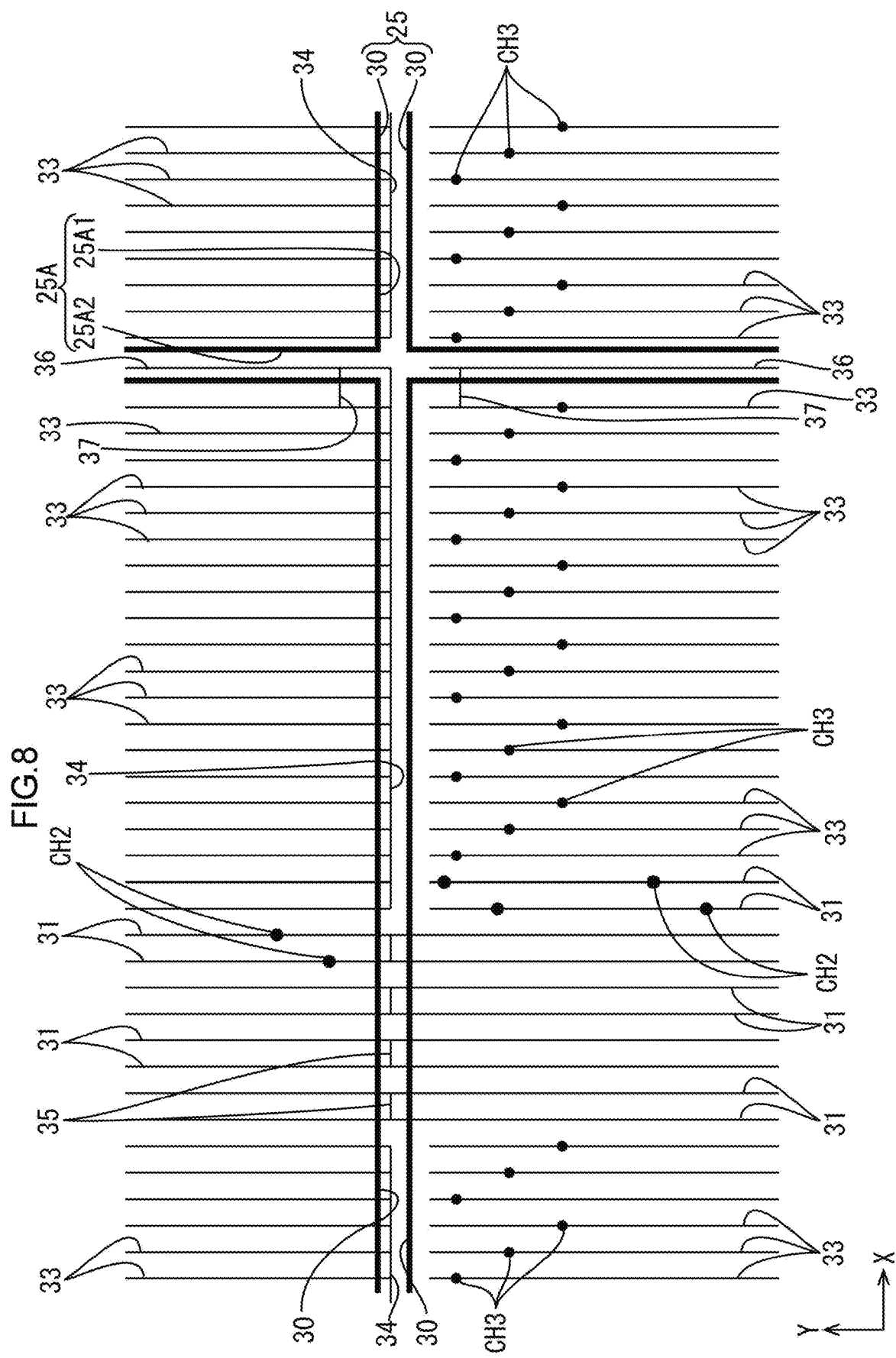
FIG. 8 is a plan view schematically illustrating configurations of the touch electrodes, the touch lines, connection lines, short-circuit lines, overlapping lines, short-circuit sections, and overlapping line short-circuit lines in the array substrate.
Figure 9:
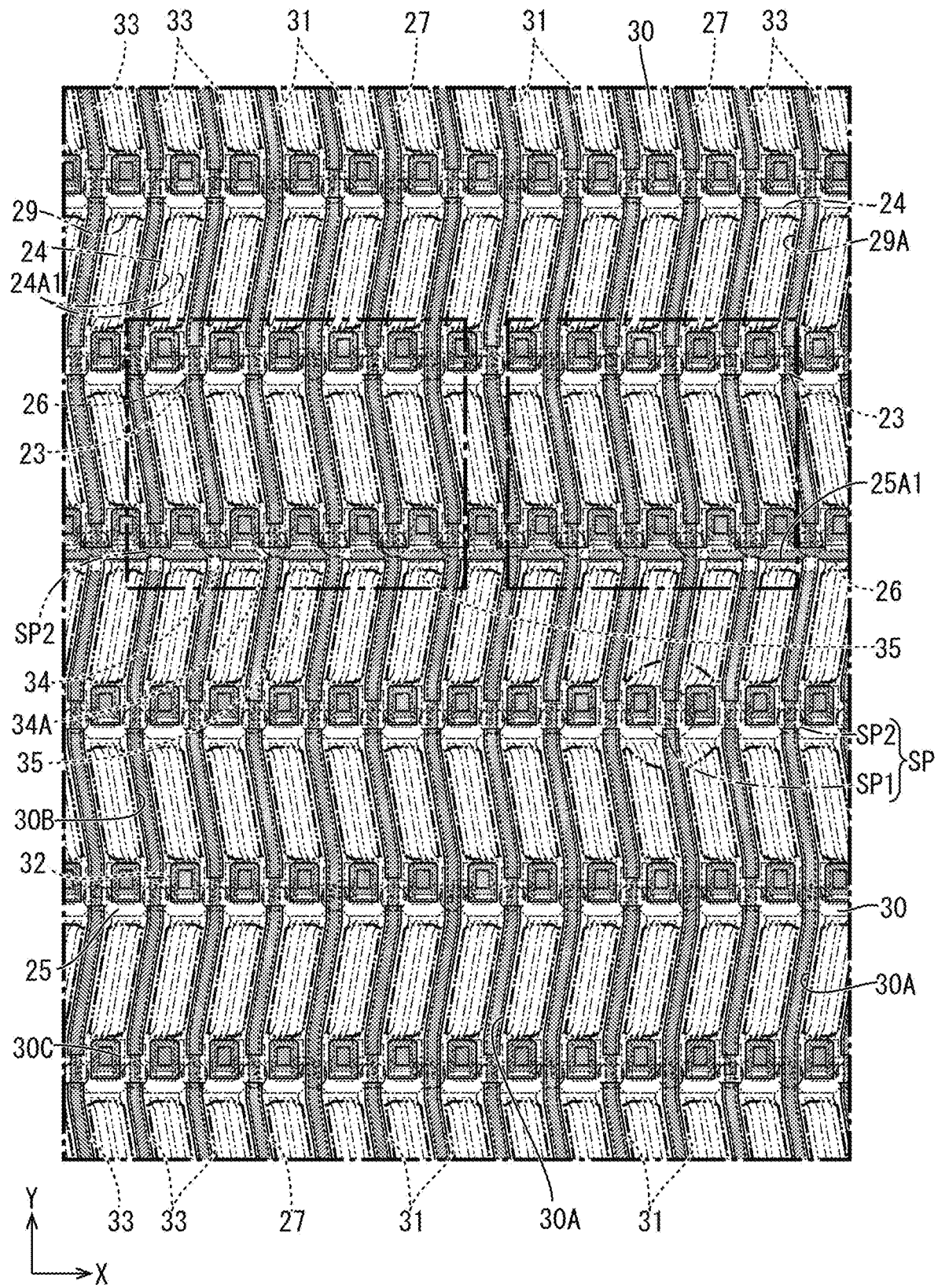
FIG. 9 is a portion of the array substrate with a pattern of a third metal.
Figure 10:
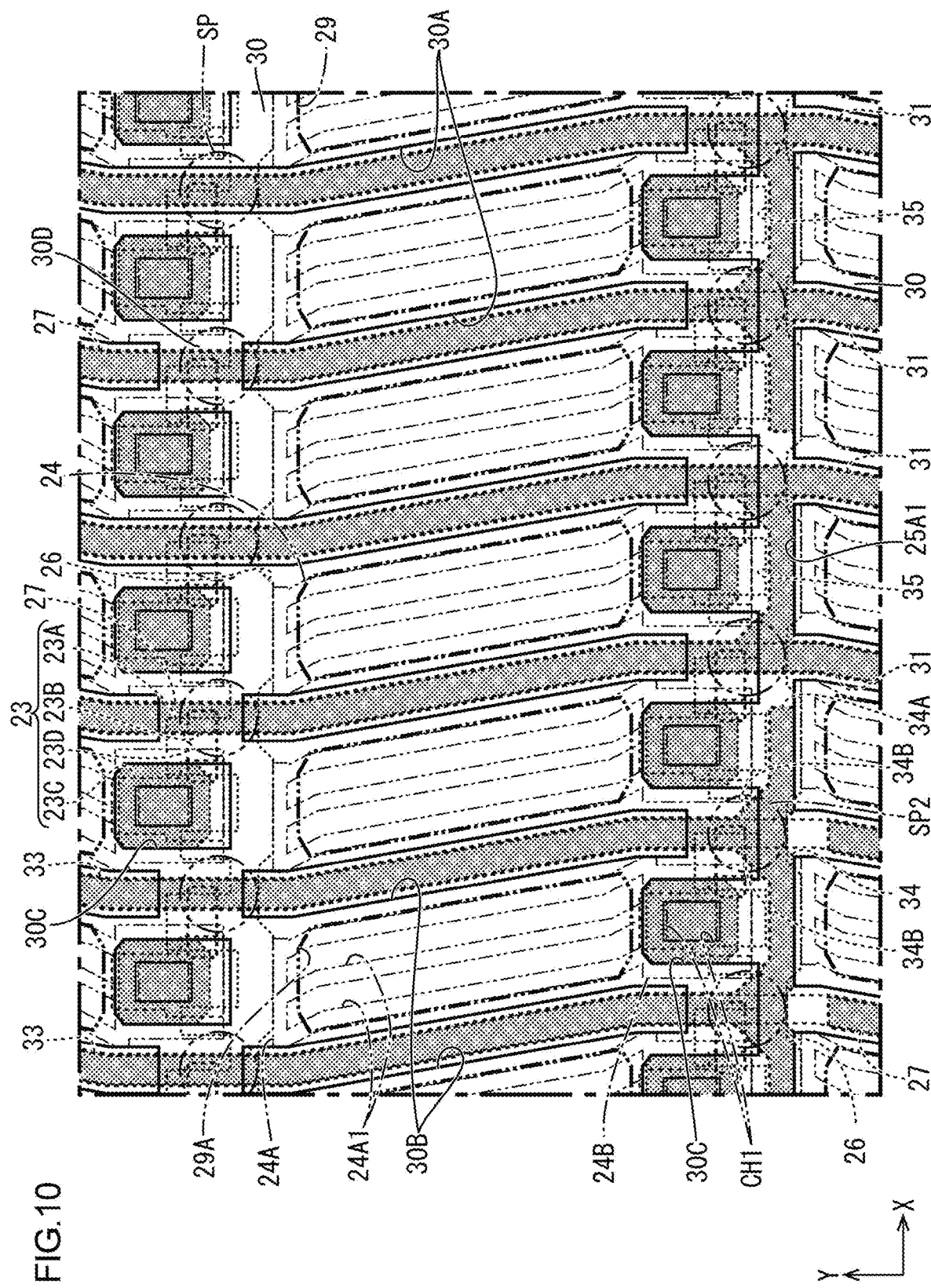
FIG. 10 is a portion of the array substrate with a pattern of the third metal.
Figure 11:
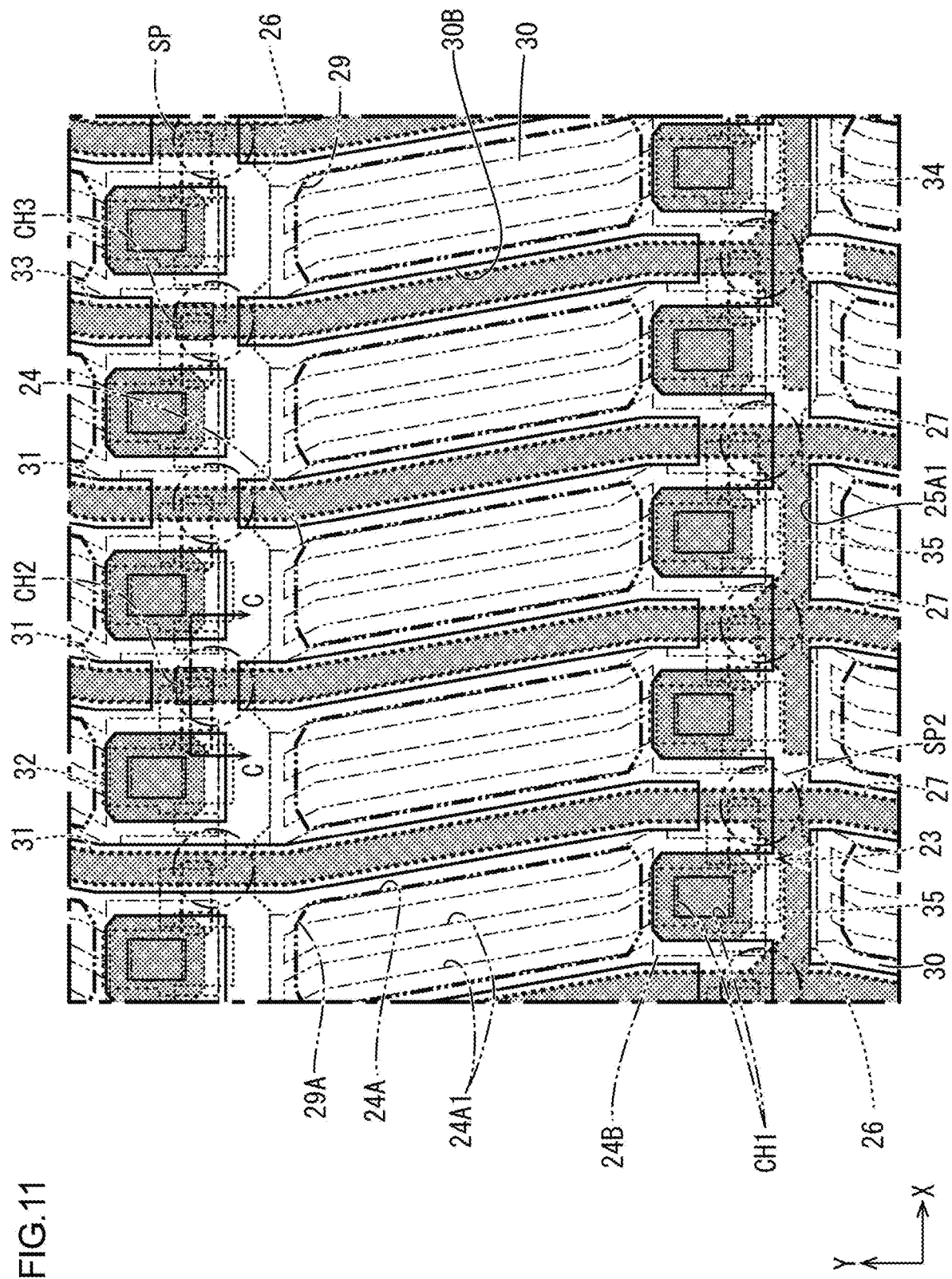
FIG. 11 is a magnified plan view illustrating a portion of the array substrate near touch line contact holes and connection line contact holes.
Figure 12:
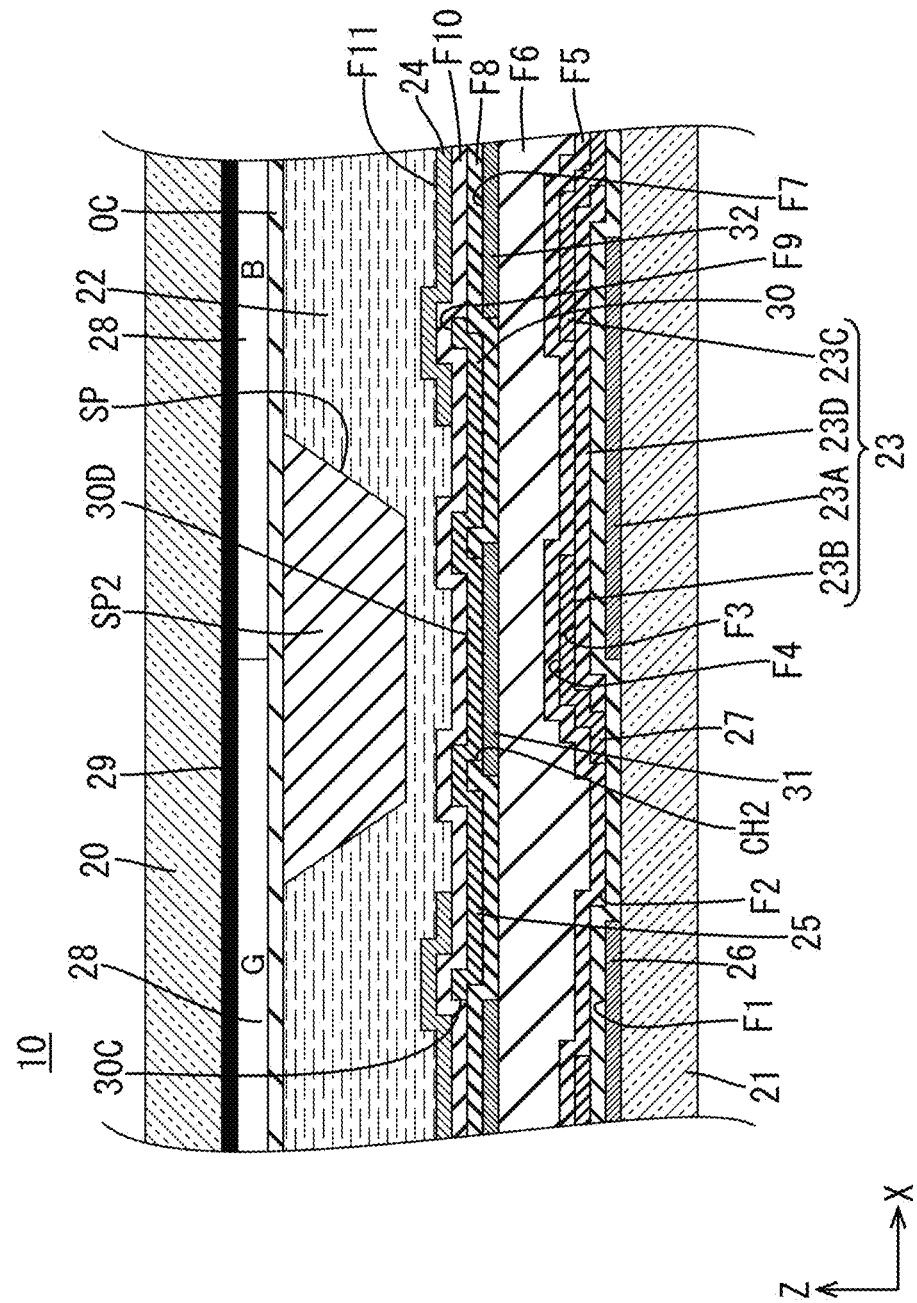
FIG. 12 is a cross-sectional view of the liquid crystal panel along line C-C in FIG. 11.

Next, a configuration of the touch lines 31 will be described with reference to FIGS. 8 to 12. FIG. 8 schematically illustrates a configuration of portions of the four touch electrodes 30 including the fourth and fifth touch electrodes 30 from the upper edge of the array substrate 21 included in the left end column of touch electrodes and a second column of touch electrodes from the left end column in FIG. 1. In FIG. 8, the contact portions of the touch electrodes 30 and the touch lines 31 (touch line contact holes CH2 and connection line contact holes CH3) are indicated by black points. FIGS. 9 to 11 are plan views illustrating patterns of the third metal film F7 (such as the touch lines 31) included in the array substrate 21, although the scale and the positions differ between the drawings. The third metal film F7 is illustrated with shading in FIGS. 9 to 11. FIG. 10 is a magnified plan view of a left section surrounded by a chain line in FIG. 9 (same as the section surrounded by the chain line in FIG. 2). FIG. 11 is a magnified plan view of a right section surrounded by a chain line in FIG. 9 (a section near the touch line contact hole CH2 and the connection line contact hole CH3). FIG. 12 is a cross-sectional view along line C-C in FIG. 11.

As illustrated in FIGS. 9 and 10, the touch lines 31 have about a same plan view shape as that of the source lines 27 and overlap most sections of the source lines 27. The touch lines 31 substantially extend along the Y-axis direction while being bending in a zig-zag form. The touch lines 31 are portions of the third metal film F7. The first interlayer insulating film F5 and the planarization film F6 are disposed between the source lines 27, which are portions of the second metal film F4, and the touch lines 31. This insulates the source lines 27 from the touch lines 31 (refer to FIG. 4). Therefore, the aperture ratio of the pixels PX is effectively increased compared to a configuration in which the source lines and the touch lines do not overlap.

As illustrated in FIGS. 11 and 12, the touch line 31 is connected to the relevant touch electrode 30 via the touchline contact hole CH2. The second interlayer insulating film F8, which is disposed between the third metal film F7 and the first transparent electrode film F9, includes the touch line contact hole CH2 in a portion overlapping the touch line 31 and the touch electrode 30 that are connected to each other (specifically, a portion overlapping the source electrode 23B). As illustrated in FIG. 8, the touch line contact holes CH2 are provided for one touch line 31 and are away from each other in the Y-axis direction. Thus, the touch line 31 is connected to the touch electrode 30 at multiple points.

As illustrated in FIG. 8, the touch lines 31 having the above-described configuration extend in the Y-axis direction along the source lines 27 from the driver 11 to the target touch electrode 30 to be connected. The touch lines 31 cross the first dividing opening 25A1 that is between the adjacent touch electrodes 30 that are adjacent to each other in the Y-axis direction and defines each of the adjacent touch electrodes 30. The touch lines 31 (two touch lines 31 in this embodiment) are connected to one target touch electrode 30. Therefore, the number of touch lines 31 connected to all the touch electrodes 30 included in one touch electrode column is equal to the number obtained by multiplying the number of touch electrode included in the touch electrode column by the number of touch lines 31 connected to one touch electrode 30. The obtained number is smaller than the number of source lines 27 overlapping one touch electrode 30. Since the number of touch lines 31 is smaller than the number of source lines 27 relative to one touch electrode 30, many of the source lines 27 do not overlap the touch lines 31 over entire length of the source lines 27. The length of the touch lines 31 measured in the Y-axis direction is limited to a distance from the driver 11 to the respective target touch electrodes 30. Therefore, the touch lines 31 are not provided for non-relevant touch electrodes 30 that are on the opposite side from the driver 11 with respect to the respective target touch electrodes 30 in the Y-axis direction. Namely, most of the touch lines 31 except for the touch lines 31 connected to the touch electrodes farthest from the driver 11 do not overlap the entire length of the source lines 27.

As illustrated in FIGS. 8 and 9, the array substrate 21 includes the connection lines 33 in sections where the touch lines 31 are not disposed and do not overlap the source lines 27 in the upper layer. The connection lines 33 are connected to the touch electrodes 30. The touch electrodes 30 are portions of the first transparent electrode film F9 that has a higher electrical resistance than that of the metal films F1, F4, F7. Therefore, potential difference may be created between the connection portion of the target touch electrode 30 connected to the touch line 31 and a portion of the target touch electrode 30 away from the connection portion (for example, a corner portion) and this results in large resistance variety in the electrical resistance distribution. The connection lines 33 connected to the touch electrodes 30 are portions of the third metal film F7 that has a lower electrical resistance than that of the first transparent electrode film F9. Therefore, potential difference is less likely to be created within a surface area of the target touch electrode 30 and this decreases the resistance variation in the electrical resistance distribution of the touch electrode 30. Particularly, the connection lines 33 are portions of the third metal film F7 and the touch lines 31 are other portions of the third metal film F7. Therefore, the stacking configuration including the first interlayer insulating film F5 and the planarization film F6 between the connection lines 33 and the source lines 27 is same as that including the films F5 and F6 between the touch lines 31 and the source lines 27. Therefore, even with the configuration in which the connection lines 33 cross the gate lines 26 that are portions of the first metal film F1, short circuits are less likely to occur between them.

As illustrated in FIGS. 8 and 9, the connection lines 33 overlap the source lines 27 and extend along the source lines 27 in the Y-axis direction as a whole. The connection lines 33 extend in the Y-axis direction only within the area of the target touch electrode 30 to be connected. Therefore, the connection lines 33 do not cross the first dividing opening 25A1 between the touch electrodes 30 that are adjacent to each other in the Y-axis direction. The source lines 27 include a first group of the source lines 27 on which touch lines 31 are not disposed and a second group of the source lines 27 portions of which the touch lines 31 are disposed on. The number of the connection lines 33 that are disposed on and overlapped with one source line 27 of the first group of the source lines 27 is same as the number of the touch electrodes 30 included in one touch electrode column. The connection lines 33 overlapping the one source line 27 included in the first group are connected to all of the touch electrodes 30 included in the one touch electrode column, respectively. The connection lines 33 are disposed on and overlapped with only portions of one source line 27 of the second group of the source lines 27 where no touch line 31 is disposed. Specifically, the connection lines 33 are disposed on a portion of each of the source lines 27 included in the second group. The portion of each source line 27 is an opposite side portion from the driver 11 in the Y-axis direction with respect to the target touch electrode 30 that is connected to the touch line 31. According to such a configuration, the number of connection lines 33 connected to the respective touch electrodes 30 included in one touch electrode column tends to increase as the touch electrodes 30 are farther away from the driver 11 in the Y-axis direction. The electrical resistance of the touch lines 31 tends to increase as the target touch electrodes 30 to be connected to the respective touch lines 31 are farther away from the driver 11 in the Y-axis direction and delay is likely to occur in the transfer of the touch signals. The number of connection lines 33 connected to the touch electrode 30 increases as the touch electrode 30 is farther away from the driver 11 among the touch electrodes 30 included in the touch electrode column. According to such a configuration, even if delay occurs in the transfer of the touch signals due to the electrical resistance relative to the touch lines 31, potential difference is less likely to be created within the surface area of the touch electrode 30 and therefore the touch detection sensitivity (position detection sensitivity) is less likely to be lowered.

Figure 13:
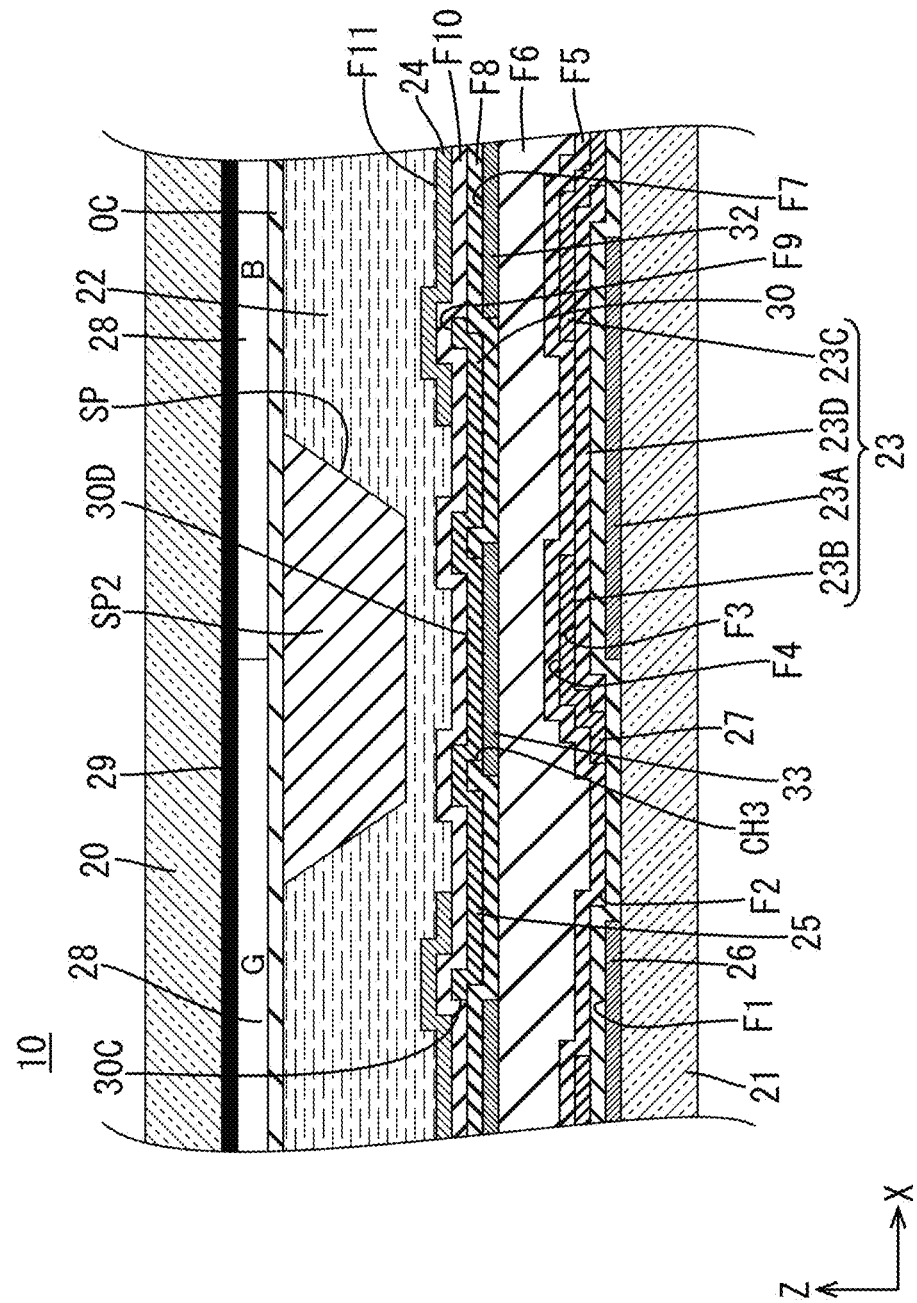
FIG. 13 is a cross-sectional view of the liquid crystal panel along line D-D in FIG. 2.

As illustrated in FIGS. 11 and 13, the connection line 33 is connected to the target touch electrode 30 via the connection line contact hole CH3. FIG. 13 is a cross-sectional view along line D-D in FIG. 2. The second interlayer insulating film F8 that is between the third metal film F7 and the first transparent electrode film F9 includes the connection line contact holes CH3 in portions thereof where the connection lines 33 and the target touch electrodes 30 to be connected to the connection lines 33 overlap. Specifically, the connection line contact holes CH3 are formed in the portions of the second interlayer insulating film F8 that overlaps the source electrodes 23B. As illustrated in FIG. 11, the connection line contact holes CH3 are formed for one connection line 33 and the connection line 33 is connected to the touch electrode 30 at multiple points.

Figure 14:
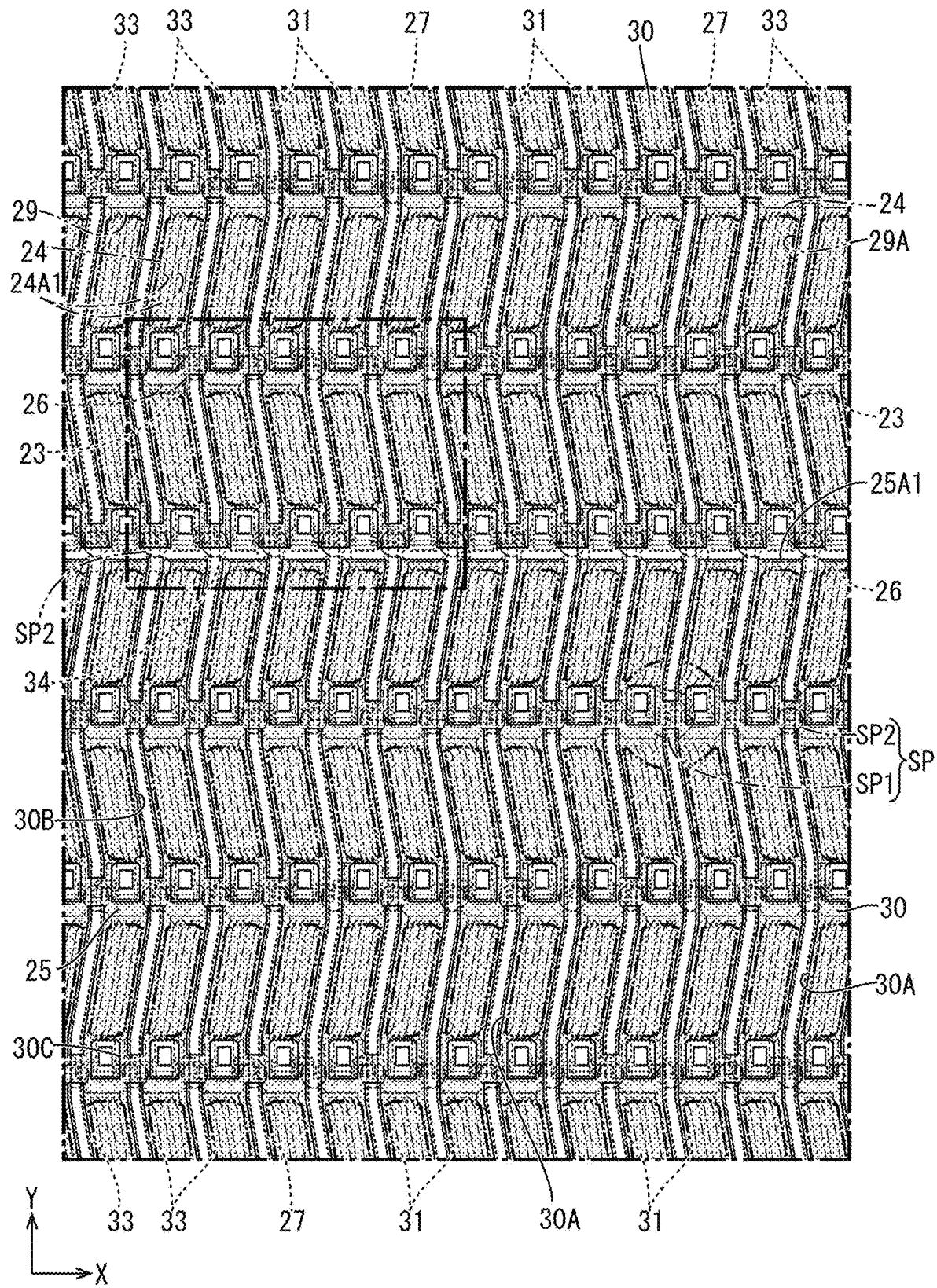
FIG. 14 is a plan view illustrating a portion of the array substrate with a pattern of a first transparent electrode film.
Figure 15:
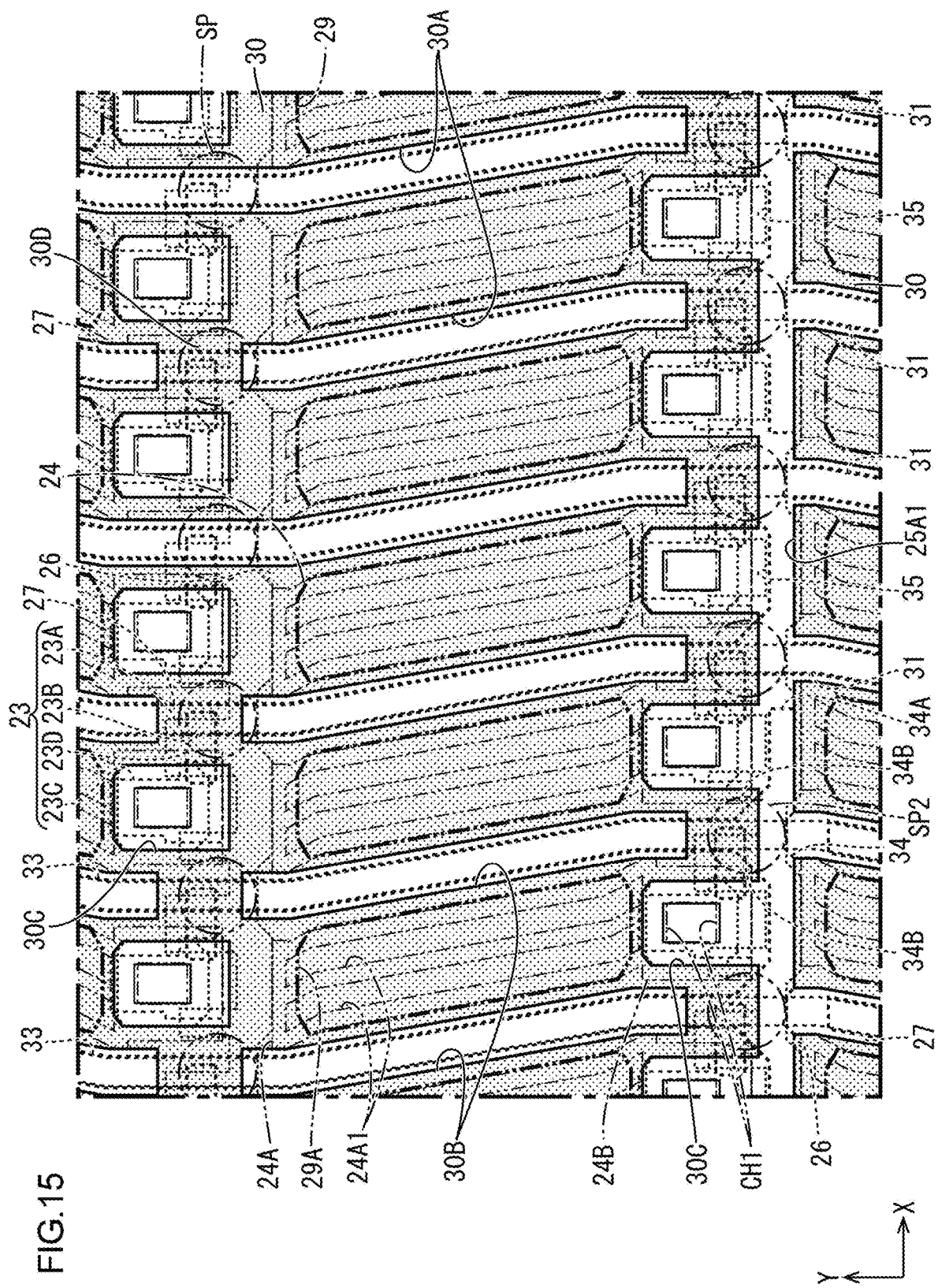
FIG. 15 is a plan view illustrating a portion of the array substrate with a pattern of the first transparent electrode film.

A specific configuration of the touch electrode 30 that is connected to the touch lines 31 and the connection lines 33 will be described with reference to FIGS. 14 and 15. FIGS. 14 and 15 are plan views illustrating patterns of the first transparent electrode film F9 (such as the touch electrodes 30) included in the array substrate 21, although the scale and the positions differ between FIG. 14 and FIG. 15. The first transparent electrode film F9 is illustrated with shading in FIGS. 14 and 15. As illustrated in FIGS. 14 and 15, the touch electrode 30 includes first openings 30A (openings) in portions thereof overlapping the touch lines 31, second openings 30B in portions thereof overlapping the connection lines 33, and third openings 30C in portions thereof overlapping the pixel contact holes CH1. The area of the touch electrode 30 overlapping the touch lines 31 is reduced by the opening areas of the first openings 30A. This reduces parasitic capacitance that may be created between the touch electrode 30 and the touch lines 31 that are connected to other touch electrodes 30. Accordingly, the touch detection sensitivity that is lowered due to the parasitic capacitance is less likely to be lowered.

As illustrated in FIGS. 14 and 15, the first openings 30A overlap sections of the touch lines 31 and do not extend an entire length of the touch lines 31. The first openings 30A extend in restricted areas in the Y-axis direction. According to such a configuration, the touch electrode 30 is not completely separated into sections by the first openings 30A with respect to the right-left direction. The touch electrode 30 includes spacer overlapping sections 30D that overlap the spacers SP, respectively. Most areas of the first openings 30A are selectively disposed in portions of the touch electrode 30 that do not overlap the spacers SP and the first openings 30A are formed to overlap the spacers SP with small areas such that a large area of the spacer overlapping sections 30D remains. Since the touch electrode 30 includes a large area of the spacer overlapping sections 30D, the resistance variety in the electrical resistance distribution of the touch electrode 30 is decreased and portions of the array substrate 21 that are opposite the spacers SP keep good flatness. According to such a configuration, the array substrate 21 can receive the spacers SP on the inner surface thereof stably and the thickness of the liquid crystal layer 22 (a gap between the substrates 20 and 21) can be stably maintained (refer to FIG. 5).

As illustrated in FIGS. 14 and 15, some of the first openings 30A extend to cross the spacers SP and some of the first openings 30A do not cross the spacers SP. According to such a configuration, the touch electrode 30 has a greater opening area of the first openings 30A compared to a configuration in which all the first openings 30A do not cross the spacers SP. Therefore, parasitic capacitance that may be created between the target touch electrode 30 and the touch lines 31 connected to other non-relevant touch electrodes 30 is further less likely to be created. To describe the configuration more in detail, the two touch lines 31 that are connected to the touch electrode 30 are arranged adjacent to each other at a distance in the X-axis direction (refer to FIG. 8). The two touch lines 31 that are connected to the touch electrode 30 includes a first touch line 31 and a second touch line 31. The first opening 30A that overlaps the first touch line 31 is defined as one first opening 30A and the first opening 30A that overlaps the second touch line 31 is defined as another first opening 30A. The one first opening 30A and the other first opening 30A include portions overlapping the spacers SP, respectively. An area of the portion of the one first opening 30A overlapping the spacer SP differs from an area of the portion of the other first opening 30A overlapping the spacer SP. According to such a configuration, charge transfer within the surface area of the touch electrode 30 becomes smooth and the resistance variety in the electrical resistance distribution of the touch electrode 30 is less likely to be increased even with the configuration including the first openings 30A.

As illustrated in FIGS. 14 and 15, similar to the first openings 30A, the second openings 30B overlap sections of the connection lines 33 and do not extend an entire length of the connection lines 33 within a surface area of the touch electrode 30. The second openings 30B extend in restricted areas in the Y-axis direction. With such second openings 30B being formed in the touch electrode 30, difference is less likely to be created between the amount of light passing through the portions near the touchlines 31 and the amount of light passing through the portions near the connection lines 33. Therefore, display unevenness of a linear shape is less likely to be seen near the touch lines 31 and display quality is improved compared to the configuration including no second openings. The second openings 30B are formed in portions of the touch electrode 30 and extend not to cross the spacers SP such that a large area of the spacer overlapping sections 30D remains in the touch electrode 30. The second openings 30B overlap all the connection lines 33; however, unlike the first openings 30A, the second openings 30B extend not to cross all the spacers SP. According to such a configuration, the greatest areas of the spacer overlapping sections 30D remain in the portions of the touch electrode 30 overlapping the connection lines 33. This is effective for decreasing the resistance variation in the electrical resistance distribution of the touch electrode 30 and also effective for keeping the thickness of the liquid crystal layer 22 stably since the spacers SP can be received by the inner surface-side components of the array substrate 21 stably. The third openings 30C overlap all the pixel contact holes CH1, respectively, that is, an opening area of each of the pixel contact holes CH1 is within each of the third openings 30C. With such a configuration, short circuits are less likely to occur between the pixel electrodes 24 and the touch electrodes 30 (the common electrode 25). The third openings 30C include ones that are between the first openings 30A and the spacer overlapping sections 30D with respect to the X-axis directions and other ones that are between two adjacent spacer overlapping sections 30D with respect to the X-axis direction. The first dividing opening 25A1 that defines each of the adjacent touch electrodes 30 with respect to the Y-axis direction is communicated with some of the third openings 30C that are arranged in the X-axis direction and overlap the pixel contact holes CH1 provided for the pixel row that is adjacent to the first dividing opening 25A1.

The arrangement of the touch lines 31 and the connection lines 33 with respect to the X-axis direction within the surface area of the touch electrode 30 will be described with reference to FIG. 8. As illustrated in FIG. 8, the touch lines 31 are collectively arranged in a middle section of the touch electrode 30 with respect to the X-axis direction. The touch lines 31 are arranged at intervals with respect to the X-axis direction and each of the intervals is equal to an X-axis dimension of the pixel PX. No connection line 33 is disposed between the touch lines 31 within the surface area of the touch electrode 30. The connection lines 33 that are provided for the touch electrode 30 are defined into two groups. The two groups of connection lines 33 are disposed on two edge sections of the touch electrode 30 with respect to the X-axis direction. The connection lines 33 of each of the two groups are arranged at intervals with respect to the X-axis direction and each of the intervals is equal to the X-axis dimension of the pixel PX. No touch line 31 is disposed between the connection lines 33 within the surface area of the touch electrode 30. Namely, the connection lines 33 are disposed between a group of the touch lines 31 and the Y-axis edge of the touch electrode 30. Parasitic capacitance may be created between the touch lines 31 and an adjacent touch electrode 30 that is arranged adjacent to the target touch electrode 30, which is connected to the touch lines 31, with respect to the X-axis direction. With the above configuration, such a parasitic capacitance can be maintained small compared to a configuration in which no connection line is disposed between a group of touch lines and the Y-axis edge of the touch electrode 30.

To decrease the resistance variation in the electrical resistance distribution of the touch electrode 30, the number of connection portions of the connection lines 33 and the touch electrode 30 needs to be increased. Namely, the number of connection line contact holes CH3 needs to be increased. However, recesses are created due to the connection line contact holes CH3 near the portions of the inner surface-side of the array substrate 21 where the connection lines 33 are connected to the touch electrode 30. Therefore, the number of the recesses increases as the number of the connection portions increases. Disorder of orientation in the liquid crystal molecules included in the liquid crystal layer 22 is likely to occur near the recesses created on the inner-surface side of the array substrate 21. This likely causes leakage of light and may result in display unevenness. In this embodiment, since the connection line contact holes CH3 are provided near the TFTs 23, the light leaking through the portions near the connection line contact holes CH3 can be blocked by the light blocking portion 29 of the CF substrate 20. However, the spacer SP that overlaps a portion of the connection line 33 is arranged near the TFT 23. Therefore, the connection line contact hole CH3 is necessarily disposed to overlap the spacer SP and with such a configuration, the contact area of the spacer SP with respect to the inner surface-side component of the array substrate 21 is decreased due to the recess that is created by forming the connection line contact hole CH3. Therefore, the spacer SP may not be received stably by the inner surface-side component of the array substrate 21. From the above-described matters, if the number of connection portions between the connection lines 33 and the touch electrode 30 is increased in order to decrease the resistance variation in the electrical resistance distribution of the touch electrode 30, the gap between the array substrate 21 and the CF substrate 20 may not be maintained stably.

As illustrated in FIGS. 8 and 9, the array substrate 21 according to this embodiment includes short-circuit lines 34 that connect the connection lines 33 to create a short circuit. Each of the short-circuit lines 34 is provided for each group of the connection lines 33 that are arranged without having the touch line 31 between the adjacent connection lines 33. The short-circuit line 34 short-circuits the connection lines 33 of the group. The short-circuit lines 34 extend in the X-axis direction that crosses the extending direction (the Y-axis direction) in which the connection lines 33 extend. The short-circuit lines 34 do not overlap the touch electrodes 30 but overlap the gate lines 26 in a plan view. Since the connection lines 33 are short-circuited by the short-circuit line 34, charges inside the connection lines 33 can be moved via the short-circuit line 34 smoothly. Accordingly, potential difference is less likely to be created between the connection portions of the touch electrode 30 connected to the touch lines 31 and the connection portions of the touch electrode 30 connected to the connection lines 33, and potential difference is less likely to be created between the connection portions of the touch electrode 30 connected to the connection lines 33. Therefore, the resistance variation in the electrical resistance distribution of the touch electrode 30 can be decreased without increasing the number of connection portions of the touch electrode 30 and the connection lines 33. Furthermore, the short-circuit lines 34 are disposed not to overlap the touch electrodes 30 but to overlap the gate lines 26. With such a configuration, electric field that is created between the gate lines 26 that do not overlap the touch electrodes 30 and the pixel electrodes 24 can be blocked by the short-circuit lines 34. The electric field that is created between the gate lines 26 and the pixel electrodes 24 may cause disorder of orientation in the liquid crystal molecules included in the liquid crystal layer 22. However, in this embodiment, with the short-circuit lines 34, such electric field is not created and disorder of orientation in the liquid crystal molecules is less likely to be caused and display error is less likely to be seen.

The area of the light blocking portion 29 in the CF substrate may be increased to reduce display errors due to the orientation disorder of the liquid crystal molecules. However, such a configuration is not necessary in this embodiment and the high aperture ratio of the pixel PX can be effectively maintained in this embodiment. The gate lines 26 include ones that do not overlap (cross) the touch electrodes 30 and other ones that overlap (cross) the touch electrodes 30. Electric field that is created between the gate lines 26 overlapping the touch electrodes 30 and the pixel electrodes 24 is blocked by the touch electrodes 30. Electric field that is created between the gate lines 26 not overlapping the touch electrodes 30 and the pixel electrodes 24 is blocked by the short-circuit lines 34. Accordingly, electric field that is created between all the gate lines 26 and the pixel electrodes 24 is blocked. Therefore, display errors due to the orientation disorder of the liquid crystal molecules are less likely to be locally seen in the portions not overlapping the touch electrodes 30 (in the portions corresponding to the first dividing openings 25A1) and display unevenness is less likely to occur.

Next, arrangement of the short-circuit lines 34 will be described in detail. As illustrated in FIGS. 8 and 9, the short-circuit lines 34 extend next to and below the touch electrode row including the touch electrodes 30 that are arranged in the X-axis direction (on the driver 11-side in the Y-axis). The short-circuit lines 34 and the rows of touch electrodes 30 are arranged alternately in the Y-axis direction. The number of short-circuit lines 34 arranged in the Y-axis direction is same as the number of the rows of touch electrodes 30. The short-circuit lines 34 are arranged in the Y-axis direction at intervals each of which is same as the Y-axis dimension of the touch electrode 30. Most of the short-circuit lines 34 except for the short circuit lines 34 that are closest to the drivers 11 are disposed between the touch electrodes 30, which are adjacent to each other in the Y-axis direction, and are disposed in the first dividing opening 25A1 that defines each of the touch electrodes 30.

As illustrated in FIGS. 8 and 9, two short-circuit lines 34 are provided for the touch electrode 30 and extend along two opposite edge sections of an X-axis edge of the touch electrode 30 with respect to the X-axis direction, respectively, and extend along the X-axis direction. The number of short-circuit lines 34 is about two times as the number of touch electrodes 30. The two short-circuit lines 34 are arranged at an interval in the X-axis direction and the touch lines 31 are disposed between the two short-circuit lines 34. As previously described, the connection lines 33 connected to the short-circuit line 34 are collectively arranged and no touch line 31 is disposed between the connection lines 33 connected to one short-circuit line 44. Therefore, the short-circuit line 34 connected to the connection lines 33 does not cross the touch line 31. As previously described, the touch lines 31 connected to one short-circuit line 34 extend from the driver 11 to the target touch electrode 30. The length of the touch lines 31 connected to the short-circuit line 34 is limited to a length from the driver 11 to the target touch electrode 30. Therefore, among the short-circuit lines 34 that are arranged at intervals in the Y-axis direction, the number of touch lines 31 disposed between two short-circuit lines 34 provided for one touch electrode 30 decreases as the short-circuit lines 34 are farther away from the driver 11 in the Y-axis direction. Accordingly, among the short-circuit lines 34 that are arranged at intervals in the Y-axis direction, the lengths of the short-circuit lines 34 extending in the X-axis direction becomes greater and the number of connection lines 33 (the number of short circuits) connected to each of the short-circuit lines 34 increases as the short-circuit lines 34 are farther away from the driver 11 in the Y-axis direction. According to such a configuration, potential difference is further less likely to be created within the surface areas of the touch electrodes 30 farther away from the drivers 11. Therefore, even if delay occurs in the transfer of the touch signals due to the electrical resistance relative to the touch lines 31, the touch detection sensitivity is less likely to be lowered.

Figure 16:
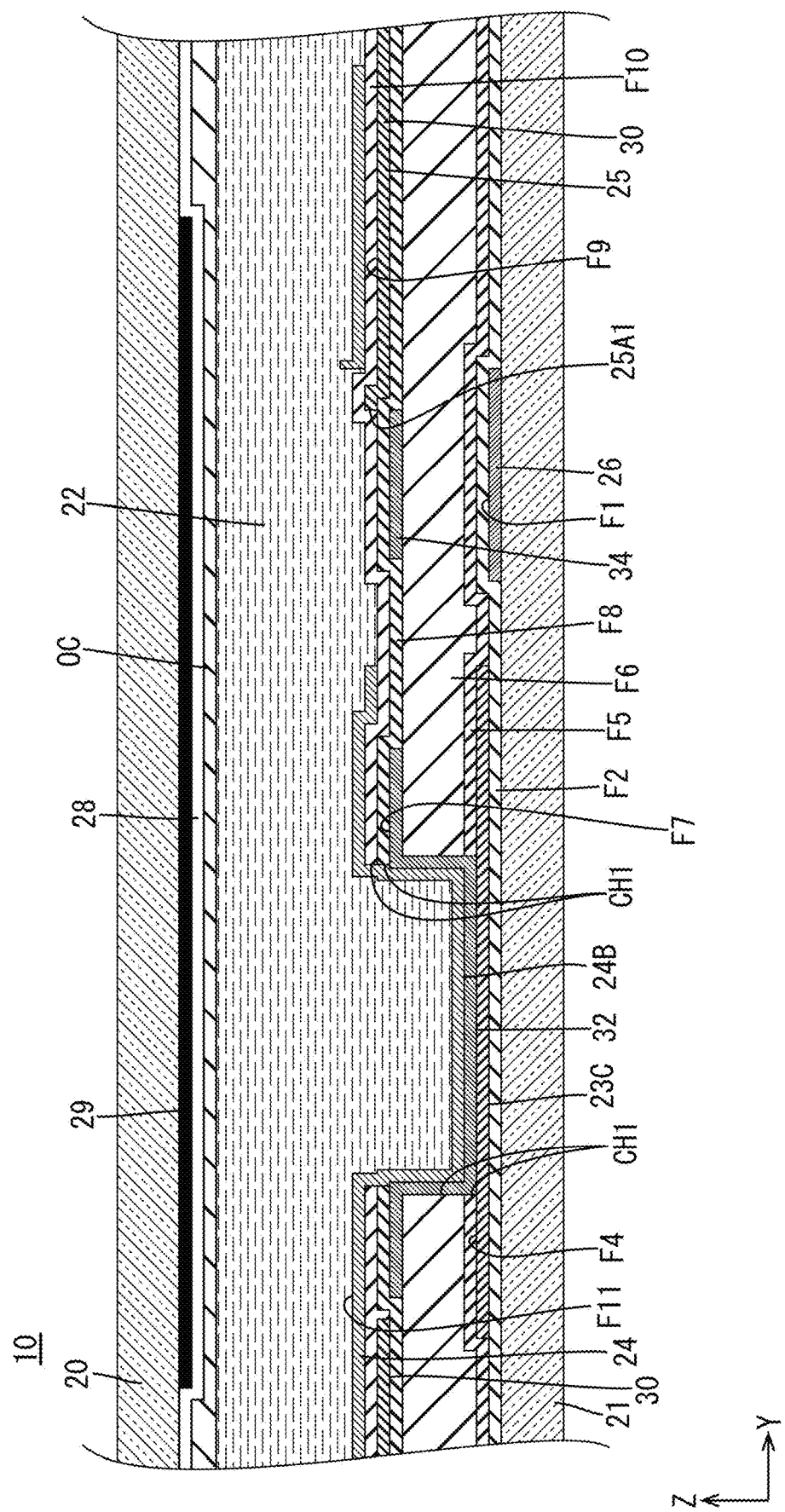
FIG. 16 is a cross-sectional view of the liquid crystal panel along line E-E in FIG. 3.

The arrangement of the short-circuit lines 34 will be described with reference to FIG. 16. FIG. 16 is a cross-sectional view along line E-E in FIG. 3. As illustrated in FIG. 16, the short-circuit line 34 is disposed in the upper layer than and overlaps the gate line 26 via the gate insulating film F2, the first interlayer insulating film F5, and the planarization film F6. The short-circuit lines 34 are portions of the third metal film F7 and are disposed between the gate lines 26, which are portions of the first metal film F1, and the pixel electrodes 24, which are portions of the second transparent electrode film F11, with respect to the Z-axis direction. According to such a configuration, electric field that is created between the gate lines 26, which are included in the lowest layer, and the pixel electrodes 24, which are included in the most upper layer, can be effectively blocked by the short-circuit lines 34, which are disposed between the gate lines 26 and the pixel electrodes 24. Since the third metal film F7 that includes the portions of the short-circuit lines 34 have lower electrical resistance than that of the first transparent electrode film F9 that includes the portions of the touch electrodes 30, charges are smoothly moved between the connection lines 33 that are connected to each other by the short-circuit line 34. This decreases the resistance variety in the electrical resistance distribution of the touch electrode 30. Furthermore, since the short-circuit lines 34 and the connection lines 33 are portions of the third metal film F7, the connection lines 33 are directly continuous to the short-circuit lines 34. Therefore, no contact holes are necessary in the connection portions of the short-circuit line 34 and the connection lines 33 and the recesses are not formed on the inner surface in the array substrate 21.

A two-dimensional configuration of the short-circuit line 34 will be described in detail with reference to FIGS. 10 and 11. As illustrated in FIG. 8, the short-circuit line 34 is connected to the target connection lines 33 of a group. The target connection lines 33 included in one group are arranged in the X-axis direction and include a first end target connection line 33 that is disposed at one end in the group with respect to the X-axis direction and a second end target connection line 33 that is disposed at another end that is an opposite end in the group from the one end with respect to the X-axis direction. The short-circuit line 34 extends in the X-axis direction from the first end target connection line 33 to the second end target connection line 33. The first end target connection line 33 connected to one short-circuit line 34 is next to the connection line 33 that is connected to another short-circuit line 34 that is next to the one short-circuit line 34 with respect to the X-axis direction. The second end target connection line 33 that is connected to the one short-circuit line 34 is next to the touch line 31 with respect to the X-axis direction. The short-circuit line 34 includes an extended portion 34A that extends in the X-axis direction further from the end of the short-circuit line 34 connected to the second end target connection line 33, which is next to the touch line 31, toward the touch line 31. The extended portion 34A is a portion of the short-circuit line 34 and a portion of the third metal film F7. The extended portion 34A overlaps the gate line 26 via the gate insulating film F2, the first interlayer insulating film F5, and the planarization film F6 (refer to FIG. 16). According to such a configuration, in an area between the touch line 31 and the connection line 33 that are adjacent to each other in the X-axis direction, electric field that is created relative to the gate line 26 can be blocked by the extended portion 34A. Further, parasitic capacitance that may be created between the touch line 31 and the gate line 26 can be decreased compared to a configuration in which the touch lines 31 include extended portions.

As illustrated in FIGS. 10 and 11, the short-circuit lines 34 have sections having a larger width and the sections are defined as wide sections 34B. The short-circuit line 34 includes the side sections at several positions with respect to the X-axis direction. The wide sections 34B are portions of the short-circuit lines 34 that overlap the spacers SP. The wide sections 34B are wider than other sections of the short-circuit lines 34 that do not overlap the spacers SP. The wide sections 34B of the short-circuit lines 34 are continuous to the connection lines 33 and the width of the wide sections 34B gradually increases toward the connection lines 33. Namely, the side edges of the wide sections 34B are inclined with respect to the X-axis direction and the Y-axis direction. According to such a configuration, large overlapping areas of the short-circuit lines 34 and the spacers SP having a circular plan view shape are obtained. Therefore, the spacers SP can be stably received by the inner surface-side components of the array substrate 21 and the thickness of the liquid crystal layer 22 can be stably maintained.

As illustrated in FIG. 11, the short-circuit line 34 is connected to the target connection lines 33 but not connected to the touch lines 31 that are connected to the relevant touch electrode 30 that is connected to the target connection lines 33. If the short-circuit line is connected to the target connection lines 33 and also to the touch lines 31, signal delay is likely to be caused in the touch signals due to parasitic capacitances created between the touchlines 31 connected to the short-circuit line and the gate line 26. Since the short-circuit lines 34 are not connected to the touch lines 31 in this embodiment, only small parasitic capacitances may be created between the touch lines 31 and the gate lines 26 and signal delay is less likely to be caused in the transfer of the touch signals that are transmitted through the touch lines 31.

As illustrated in FIGS. 10 and 11, the touch lines 31 are not connected to the short-circuit lines 34; however, the touch lines 31 that are connected to the touch electrode 30 are connected to each other by a short-circuit section 35 to create short circuit therebetween. The short circuit section 35 connects the two touch lines 31 that are connected to the target touch electrode 30 and extends ion the X-axis direction from one of the two touch lines 31 to the other. According to such a configuration, since the touch electrode 30 is connected to the two touch lines 31 that are short-circuited by the short-circuit section 35, electrical resistances of the touch lines 31 are decreased and signal delay is less likely to be caused in the touch signals transferred through the touch lines 31. The short-circuit sections 35 are portions of the third metal film F7 that is disposed between the first metal film F1 and the second transparent electrode film F11. The short-circuit sections 35 overlap the gate lines 26 that are portions of the first metal film F1. Therefore, the gate insulating film F2, the first interlayer insulating film F5, and the planarization film F6 are disposed between the short-circuit sections 35, which are portions of the third metal film F7, and the gate lines 26, which are portions of the first metal film F1, similarly to the gate insulating film F2, the first interlayer insulating film F5, and the planarization film F6 that are disposed between the short-circuit lines 34 and the gate lines 26 (refer to FIG. 16). According to such a configuration, electric fields that are created between the gate lines 26, which are included in the lowest layer, and the pixel electrodes 24, which are included in the most upper layer, are effectively blocked by the short-circuit sections 35 that are disposed between the gate lines 26 and the pixel electrodes 24. The third metal film F7 that includes the portions of the short-circuit sections 35 have electrical resistance lower than that of the first transparent electrode film F9 that includes the portions of the touch electrodes 30. Therefore, charge transfer between the two touch lines 31 short-circuited by the short-circuit section 35 becomes smooth and the electrical resistance of the touch lines 31 can be effectively reduced. Furthermore, since the short-circuit sections 35 and the touch lines 31 are portions of the third metal film F7, the short-circuit sections 35 are directly continuous to the touch lines 31. According to such a configuration, no contact holes are provided in the connection portions of the short-circuit sections 35 and the touch lines 31 and therefore, the recesses that are created by forming the contact holes are not formed on the inner surface side of the array substrate 21.

Figure 17:
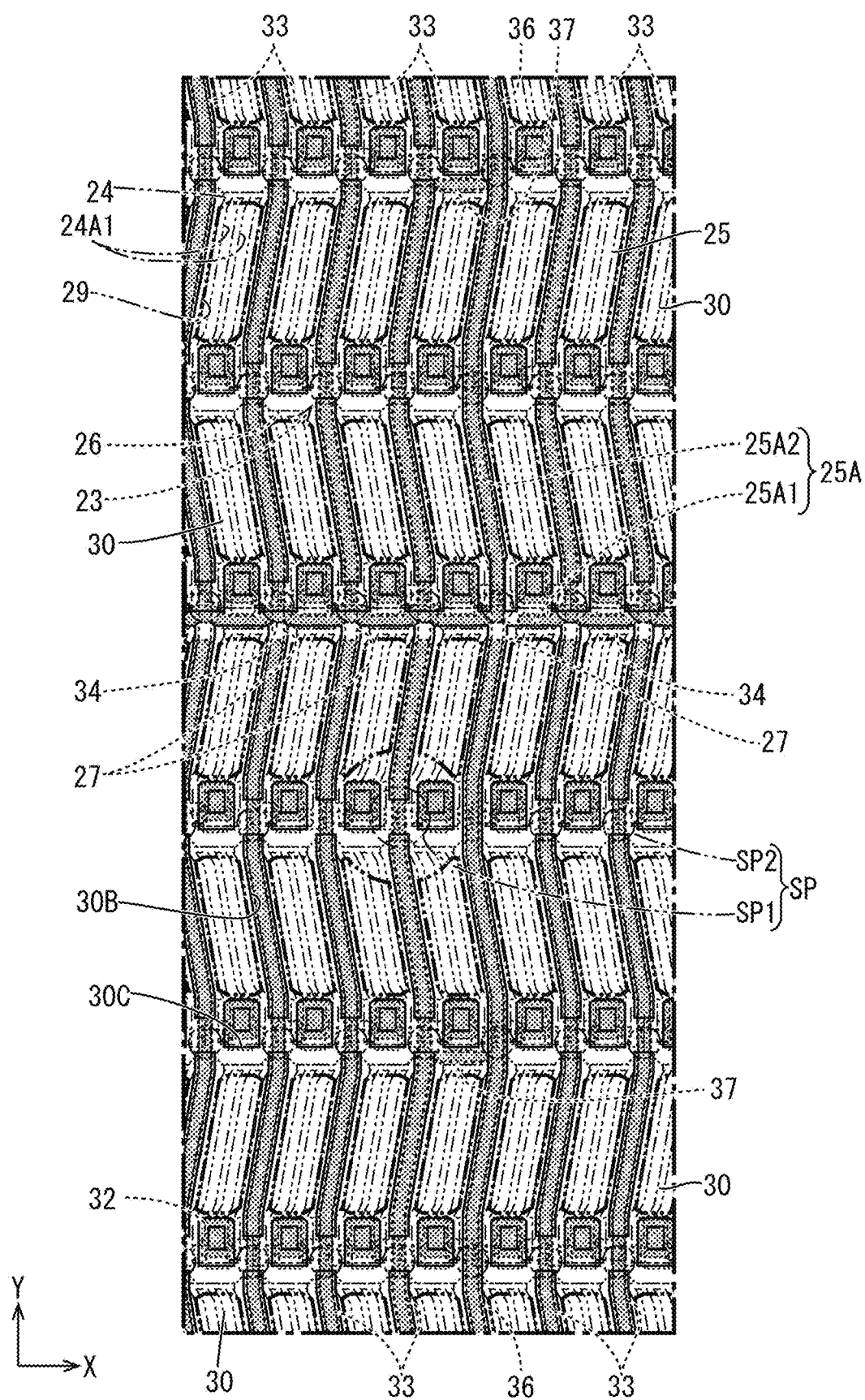
FIG. 17 is a portion of the array substrate near second dividing holes in the common electrode.
Figure 18:
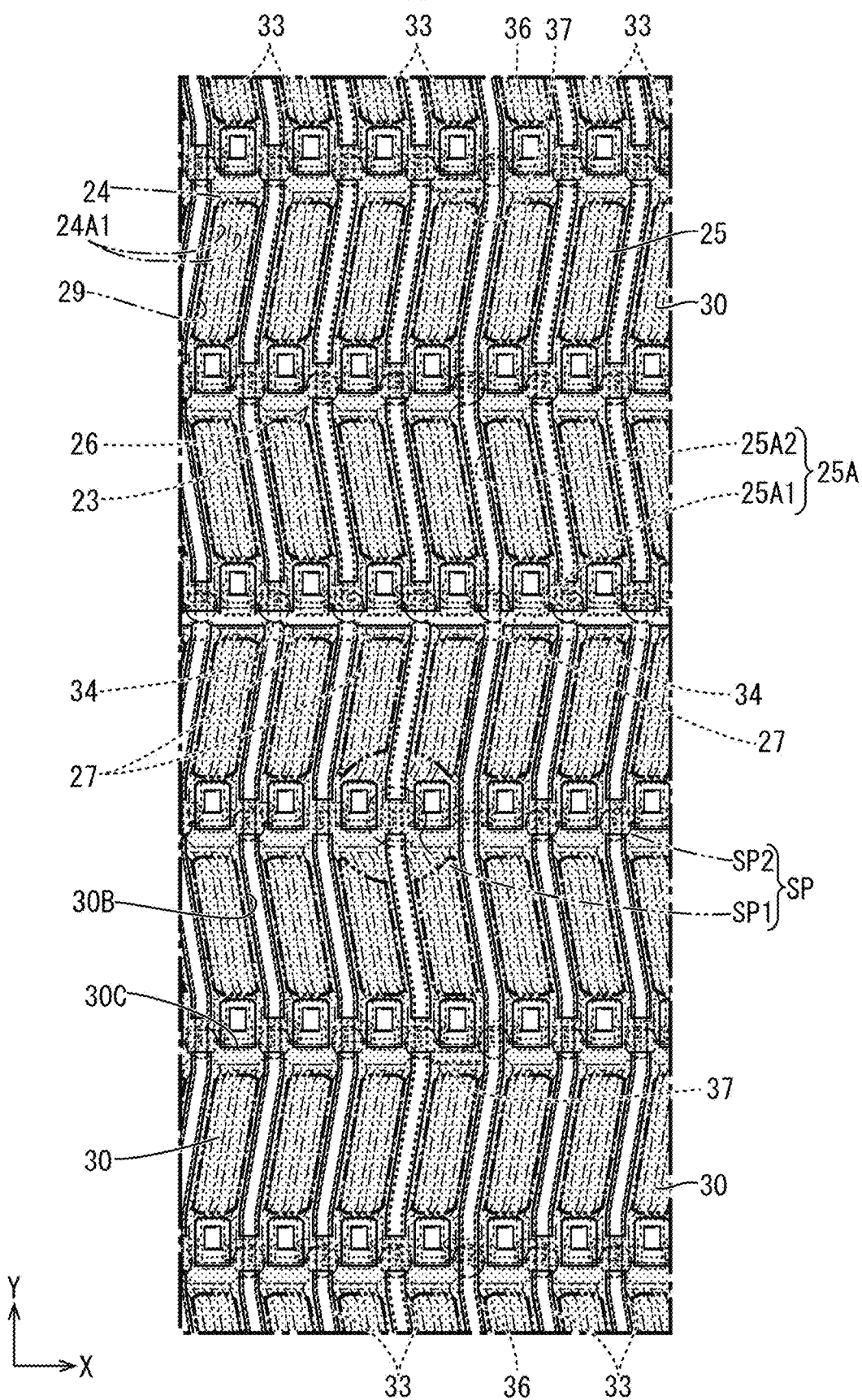
FIG. 18 is a plan view illustrating a portion of the array substrate with a pattern of the first transparent electrode film.

Next, the configuration of a section near the border (a second dividing opening 25A2) between the touch electrodes 30 that are adjacent to each other with respect to the X-axis direction will be described with reference to FIGS. 17 and 18. FIG. 17 is a plan view illustrating a pattern of the third metal film F7 (the touch lines 31) near the second dividing opening 25A2 of the array substrate 21. In FIG. 17, sections having the third metal film F7 are illustrated with shading. FIG. 18 is a plan view illustrating a pattern of the first transparent electrode film F9 (the touch electrodes 30) near the second dividing opening 25A2 of the array substrate 21. In FIG. 18, sections having the first transparent electrode film F9 are illustrated with shading.

The touch lines 31 are not disposed in sections of the array substrate 21 having no touch electrodes 30 (refer to FIGS. 17 and 18). Overlapping lines 36 are disposed in the upper layer than the source lines 27 in the sections of the array substrate 21 having no touch electrodes 30. Since the overlapping lines 36 and the touch lines 31 are portions of the third metal film F7, the stacking structure including the first interlayer insulating film F5 and the planarization film F6 between the overlapping lines 36 and the source lines 27, which are portions of the second metal film F4, is similar to the stacking structure including the first interlayer insulating film F5 and the planarization film F6 between the touch lines 31 and the source lines 27. Furthermore, short-circuit is not caused with the configuration in which the overlapping lines 36 cross the gate lines 26, which are portions of the first metal film F1 (refer to FIG. 4). The overlapping lines 36, which are portions of the third metal film F7, are disposed between the source lines 27, which are portions of the second metal film F4, and the pixel electrodes 24, which are portions of the second transparent electrode film F11. According to such a configuration, electric fields created between the pixel electrodes 24 and the source lines 27 that do not overlap the touch electrodes 30 can be blocked by the overlapping lines 36. The electric fields created between the source lines 27 and the pixel electrodes 24 may cause orientation disorder in the liquid crystal molecules in the liquid crystal layer 22. In this embodiment, such electric fields are blocked by the overlapping lines 36 and the orientation disorder in the liquid crystal molecules is less likely to occur and display errors are less likely to be seen.

As illustrated in FIGS. 8, 17, and 18, the overlapping lines 36 overlap the source lines 27 and extend along the source lines 27 in the Y-axis direction. The length of the overlapping lines 36 is limited to a Y-axis dimension of the touch electrodes 30 that are next to the overlapping lines 36 with respect to the X-axis direction. Therefore, the overlapping lines 36 do not cross the first dividing openings 25A1 that extend between the touch electrodes 30 that are adjacent to each other with respect to the Y-axis direction. The overlapping lines 36 are disposed on the right side (on the same side as the source line 27 connected to the TFTs 23) of the touch electrode column including the relative touch electrodes 30 that are arranged in the Y-axis direction. The overlapping lines 36 and the touch electrodes 30 are alternately arranged in the X-axis direction and the number of overlapping lines 36 with respect to the X-axis direction is equal to the number of touch electrode columns. Among the overlapping lines 36 arranged in the X-axis direction at intervals each of which is about the X-axis dimension of the touch electrode 30, most of the overlapping lines 36 except for the overlapping lines 36 disposed at the right edge of the array substrate 21 are disposed between the adjacent touch electrodes 30 that are adjacent to each other in the X-axis direction and are disposed in the second dividing openings 25A2 that define each of the adjacent touch electrodes 30.

The overlapping lines 36 having the above-described configuration are connected to the short-circuit lines 34 as illustrated in FIGS. 8, 17, and 18. More in detail, the short-circuit line 34 extends further toward the overlapping line 36 in the X-axis direction from a section of the short-circuit line 34 connected to the connection line 33 that is next to the overlapping line 36 in the X-axis direction. The extended end of the short-circuit line 34 is continuous to the overlapping line 36. By connecting the overlapping line 36 and the short-circuit line 34, the resistance variation in the electrical resistance distribution of the touch electrode 30 can be decreased. Furthermore, since the overlapping lines 36 and the short-circuit lines 34 are portions of the third metal film F7, the overlapping lines 36 are directly continuous to the short-circuit lines 34. According to such a configuration, no contact holes are not necessary in the connection portions of the overlapping lines 36 and the short-circuit lines 34 and therefore, the recesses that are created due to the contact holes are not formed on the inner surface side of the array substrate 21.

As illustrated in FIGS. 8, 17, and 18, an overlapping line short-circuit section 37 is provided between the overlapping line 36 and the connection line 33 that are connected to the same short-circuit line 34 to create a short circuit therebetween. The overlapping line short-circuit section 37 extends in the X-axis direction from the overlapping line 36 to the connection line 33 that is away from the overlapping line 36 with a space of about one pixel PX in the X-axis direction. The overlapping line short-circuit sections 37 (for example three overlapping line short-circuit sections 37) are disposed at intervals each of which is about the Y-axis dimensions of some pixels PX and this creates short circuits between the overlapping line 36 and the connection line 33 at several portions. By connecting the overlapping lines and the connection lines 33 with the overlapping line short-circuit sections 37, the electrical resistances related to the overlapping lines 36 and the connection lines 33 are decreased. This further decreases the resistance variation in the electrical resistance distribution of the touch electrode 30. Since the overlapping line short-circuit sections 37, the connection lines 33, and the overlapping lines 36 are portions of the third metal film F7, the overlapping line short-circuit sections 37, the connection lines 33, and the overlapping lines 36 are continuous to each other directly. According to such a configuration, no contact holes are not necessary in the connection portions of the overlapping line short-circuit sections 37, the connection lines 33, and the overlapping lines 36. Therefore, the recesses that are created due to the contact holes are not formed on the inner surface side of the array substrate 21.

As described above, the array substrate 21 (a wiring board) according to this embodiment includes touch lines 31 (position detection lines), touch electrodes 30 (position detection electrodes), gate lines 26 (lines), connection lines 33, and short-circuit lines 34. The touch lines 31 extend in a first direction and transfer at least touch signals (position detection signals). The touch electrodes 30 are connected to the touchlines 31 and are arranged at intervals at least in the first direction. The gate lines 26 extend along a second direction that crosses the first direction and are disposed between the touch electrodes 30 that are adjacent to each other with respect to the first direction. The connection lines 33 extend along the first direction and are connected to the touch electrodes 30 and are arranged at intervals with respect to the second direction. The short-circuit lines 34 extend along the second direction and are disposed to overlap the gate lines 26 via the gate insulating film F2, the first interlayer insulating film F5, and the planarization film F6 and connected to the connection lines 33.

According to such a configuration, parasitic capacitances are created between the touch electrodes 30 and the position inputter that performs position input and the input position inputted by the position inputter can be detected with using the touch signals supplied via the touch lines 31. The touch electrodes 30 are connected to the connection lines 33 that extend along the first direction and are arranged at intervals with respect to the second direction. The connection lines 33 are connected to each other by the short-circuit lines 34 that extend along the second direction. According to such a configuration, the resistance variation in the electrical resistance distribution of the touch electrode 30 can be decreased. To decrease the resistance variation in the electrical resistance distribution of the touch electrode 30 without including the short-circuit lines 34, the number of connection portions of the connection lines 33 and the touch electrodes 30 needs to be increased; however, the number of such connection portions is not necessary to be increased by providing the short-circuit lines 34. This decreases the number of connection portions between the connection lines 33 and the touch electrodes 30. Furthermore, the short-circuit lines 34 extend along the second direction and are disposed to overlap the gate lines 26 via the gate insulating film F2, the first interlayer insulating film F5, and the planarization film F6. Therefore, electric fields created relative to the gate lines 26 that are disposed between the touch electrodes 30 adjacent to each other with respect to the first direction can be blocked by the short-circuit lines 34. This suppresses occurrence of errors due to the electric fields created relative to the gate lines 26.

A group of the touch lines 31 are arranged away from a group of the connection lines 33 with respect to the second direction. The short-circuit line 34 includes the extended portion 34A that extends in the second direction further from the end of the short-circuit line 34 connected to the connection line 33, which is next to the touch line 31, toward the touch line 31. The extended portion 34A overlaps the gate line 26 via the gate insulating film F2, the first interlayer insulating film F5, and the planarization film F6. According to such a configuration, in an area between the touch line 31 and the connection line 33 that are adjacent to each other, electric field that is created relative to the gate line 26 can be blocked by the extended portion 34A. Parasitic capacitance that may be created between the touch line 31 and the gate line 26 can be decreased compared to a configuration in which the touch lines 31 include extended portions.

The touch lines 31 are connected to the touch electrode 30. The array substrate 21 further includes the short-circuit sections 35 that short circuit the touch lines 31 that are connected to the touch electrode 30. The short-circuit sections 35 are disposed to overlap the gate line 26 via the gate insulating film F2, the first interlayer insulating film F5, and the planarization film F6. According to such a configuration, since the touch electrode 30 is connected to the touch lines 31 that are short-circuited by the short-circuit section 35, electrical resistance of the touch lines 31 is decreased and signal delay is less likely to be caused in the touch signals transferred through the touch lines 31. The short-circuit sections 35 are disposed to overlap the gate lines 26 via the gate insulating film F2, the first interlayer insulating film F5, and the planarization film F6. According to such a configuration, electric fields that are created relative to the gate lines 26 are blocked by the short-circuit sections 35. This suppresses occurrence of errors due to the electric fields created relative to the gate lines 26.

The touch lines 31 that are connected to the touch electrodes 30 included in a touch electrode column and arranged at intervals in the first direction are arranged at intervals in the second direction such that no connection lines 33 are disposed between the touch lines 31. Since no connection line 33 is disposed between the touch lines 31 that are arranged for one touch electrode 30 in the second direction at intervals, the short circuit line 34 is connected to the connection lines 33 without crossing the touch lines 31. Therefore, such a configuration is effective for the short-circuit lines 34 and the touch lines 31 that are portions of the same conductive film.

The touch electrodes 30 are arranged at intervals in the second direction. The connection lines 33 that are short circuited by the short-circuit line 34 are disposed between the touch lines 31 connected to a target touch electrode 30 out of the touch electrodes 30 that are arranged at intervals in the first direction and the edge of the target touch electrode 30 extending in the first direction. Parasitic capacitance may be created between the touch lines 31 and an adjacent touch electrode 30 that is arranged adjacent to and away from the target touch electrode 30, which is connected to the touch lines 31, with respect to the second direction.

With the above configuration, the parasitic capacitance can be maintained small compared to a configuration in which no connection lines 33 are disposed between the touch lines and the edge of the touch electrode 30 with respect to the second direction.

The touch electrodes 30 are arranged at intervals in the second direction. The array substrate 21 further includes the source lines 27 (first lines) and the overlapping lines 36. The source lines 27 extend along the first direction and are arranged between the touch electrodes 30 that are adjacent to each other with respect to the second direction. The overlapping lines 36 extend along the first direction and are disposed to overlap the source lines 27 via the first interlayer insulating film F5 and the planarization film F6. The overlapping lines 36 are connected to the short-circuit line 34. The overlapping lines 36 are disposed to overlap the source lines 27, which extend along the first direction and are arranged between the adjacent touch electrodes 30 with respect to the second direction, via the first interlayer insulating film F5 and the planarization film F6. Therefore, electric fields created relative to the source lines 27 can be blocked by the overlapping lines 36. This suppresses occurrence of errors due to the electric fields created relative to the source lines 27. Furthermore, since the overlapping lines 36 are connected to the short-circuit lines 34, the resistance variation in the electrical resistance distribution of the touch electrode 30 can be decreased.

The connection lines 33 include one connection line that is disposed away from the overlapping line 36 with respect to the second direction. The array substrate 21 further includes the overlapping line short-circuit sections 37 that connect the overlapping lines 36 and the connection lines 33 that are away from the overlapping lines 36 with respect to the second direction. According to such a configuration, the overlapping lines 36 and the connection lines 33 are short-circuited by the overlapping line short-circuit sections 37. This decreases the electrical resistances of the overlapping lines 36 and the connection lines 33. This further decreases the resistance variation in the electrical resistance distribution of the touch electrodes 30.

The short-circuit line 34 is connected to the connection lines 33 that are connected to the touch electrode 30 and is not connected to the touch lines 31 that are connected to the same touch electrode 30. According to such a configuration, only small parasitic capacitances may be created between the touch lines 31 and the gate lines 26 compared to a configuration in which the short-circuit line is connected to the touch lines 31 and the connection lines 33 that are connected to the touch electrode 30.

The short-circuit lines 34 and the connection lines 33 are portions of the third metal film F7 (the conductive film). According to such a configuration, the short-circuit lines 34 are directly continuous from the connection lines 33 to connect them. Therefore, no contact holes are necessary at the connection portions of the short-circuit lines 34 and the connection lines 33.

The array substrate 21 further includes the driver (the signal supply section) on one end side of the touch electrode column (a position detection electrode column) including the touch electrodes 30 arranged along the first direction. The touch signals are transferred from the driver 11 to the touch lines 31. The short-circuit lines 34 and the touch electrodes 30 are alternately arranged in the first direction. The number of connection lines 33 connected to each of the short-circuit lines 34 (the number of short circuits) increases as positions of the short-circuit lines 34 are farther away from the driver 11. According to such a configuration, the position of input by the position inputter can be detected with the touch electrodes 30 using the touch signals supplied to the touch lines 31 from the driver 11. Among the touch lines 31 that are connected to each of the touch electrodes 30 included in the touch electrode column, electrical resistance increases and signal delay is likely to occur as the target touch electrode 30 to be connected to the touch lines 31 is farther away from the driver 11 with respect to the first direction. Therefore, the resistance variations in the electrical resistance distributions of the touch electrodes 30 tend to be increased as the touch electrodes 30 are farther away from the driver 11 with respect to the first direction. In this respect, the number of connection lines 33 that are connected to each of the short-circuit lines 34 increases as the relative touch electrodes 30 are farther away from the driver 11 with respect to the first direction. Therefore, the resistance variations in the electrical resistance distributions of the touch electrodes 30 that are far away from the driver 11 with respect to the first direction can be decreased effectively. Difference is less likely to be caused in the electrical resistance distributions of the respective touch electrodes 30 included in the touch electrode column.

The liquid crystal panel 10 (a display device) according to this embodiment includes the array substrate 21 and the CF substrate 20 (an opposed substrate) that is disposed to be opposite and away from the array substrate 21. The array substrate 21 includes the pixel electrodes 24 and the TFTs 23 (switching components) that are connected to the pixel electrodes 24 and the gate lines 26. According to the liquid crystal panel 10 having such a configuration, the TFTs 23 are driven and the pixel electrodes 24 are charged according to the signals transferred via the gate lines 26 to display images. Electric fields that may be created between the gate lines 26 and the pixel electrodes 24 can be blocked by the short-circuit lines 34 that are disposed to overlap the gate lines 26 via the gate insulating film F2, the first interlayer insulating film F5, and the planarization film F6. Therefore, display quality is less likely to be deteriorated due to the electric fields.

The CF substrate 20 includes the spacers SP to maintain the gap between the CF substrate 20 and the array substrate 21. The short-circuit lines 34 include the wide sections 34B that overlap the spacers SP and have a large width. The spacers SP maintain the gap between the array substrate 21 and the CF substrate 20. The wide sections 34B that overlap the spacers SP are wider than other sections of the short-circuit lines 34. Therefore, the short-circuit lines 34 have a larger overlapping area overlapping the spacers SP compared to short-circuit lines without having the wide sections. According to such a configuration, the array substrate 21 can receive the spacers SP stably and the gap between the array substrate 21 and the CF substrate 20 can be stably maintained.

The CF substrate 20 includes the spacers SP that maintains the gap between the CF substrate 20 and the array substrate 21 and some of the spacers SP overlap portions of the touch lines 31. The touch electrodes 30 include the first openings 30A (openings) and the spacer overlapping sections 30D. The first openings 30A extend along the first direction to overlap the touch lines 31 but not to cross the spacers SP. The spacer overlapping sections 30D overlap large areas of the spacers SP. According to such a configuration, the spacers SP keep the gap between the array substrate 21 and the CF substrate 20. The overlapping area of the touch electrode 30 overlapping the touch lines 31 is decreased by forming the first openings 30A extending along the first direction. This reduces parasitic capacitances that may be created between the touch electrode 30 and the touch lines 31 that are connected to other touch electrode 30. Furthermore, the touch electrodes 30 include the first openings 30A that do not cross the spacers SP and include the spacer overlapping sections 30D that overlap large areas of the spacers SP. Therefore, the touch electrodes 30 have the large overlapping area overlapping the spacers SP. The array substrate 21 can stably receive the spacers SP and the gap between the array substrate 21 and the CF substrate 20 can be stably maintained.

Second Embodiment

A second embodiment will be described with reference to FIGS. 19 to 21. In the second embodiment, a configuration of connection lines 133 differs from that of the connection lines 33 in the first embodiment. Configuration, functions, and effects similar to those of the first embodiment may not be described.

Figure 19:
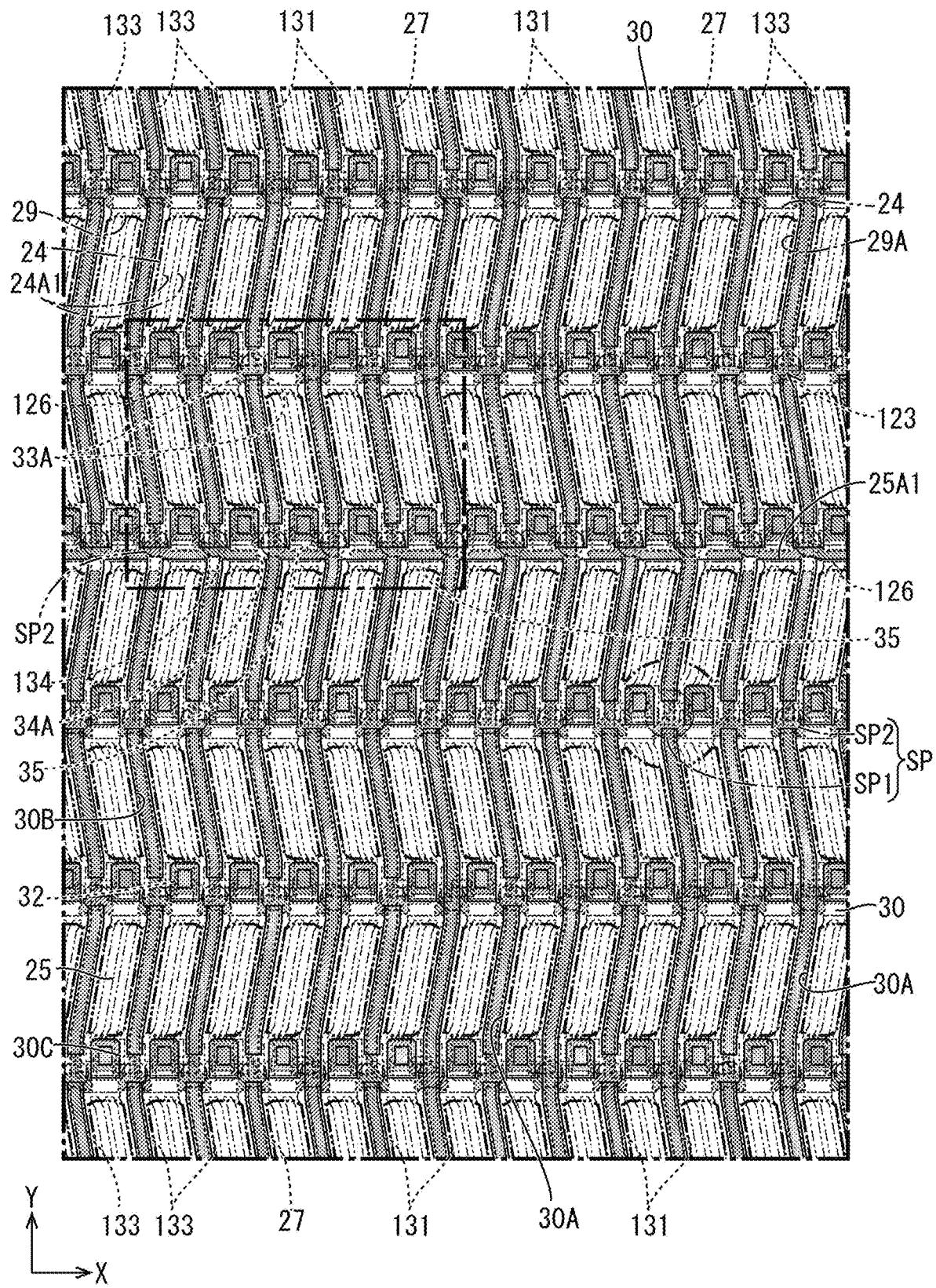
FIG. 19 is a plan view illustrating a portion of an array substrate with a pattern of the third metal film according to a second embodiment.
Figure 20:
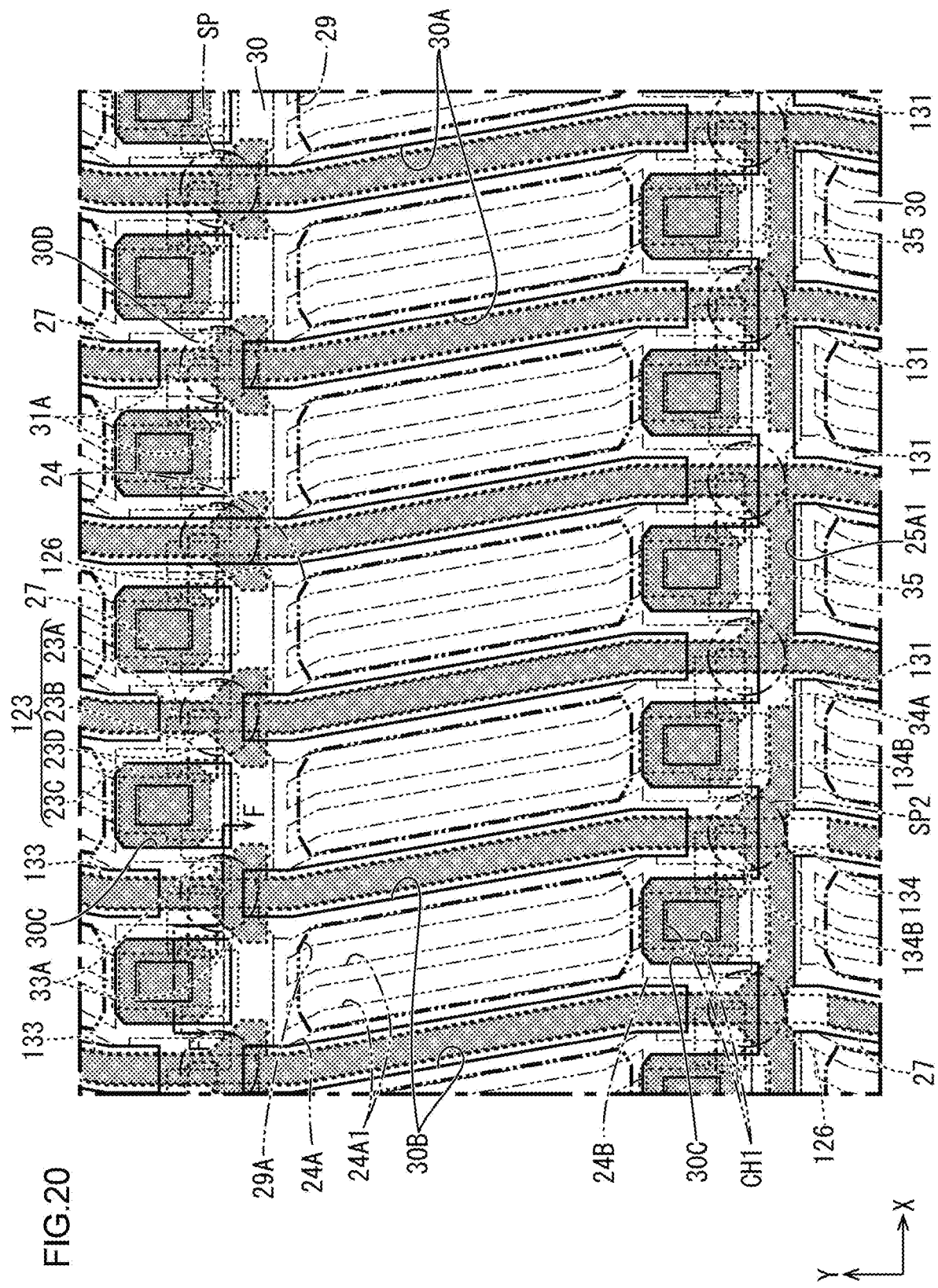
FIG. 20 is a plan view illustrating a portion of the array substrate with a pattern of the third metal film.
Figure 21:
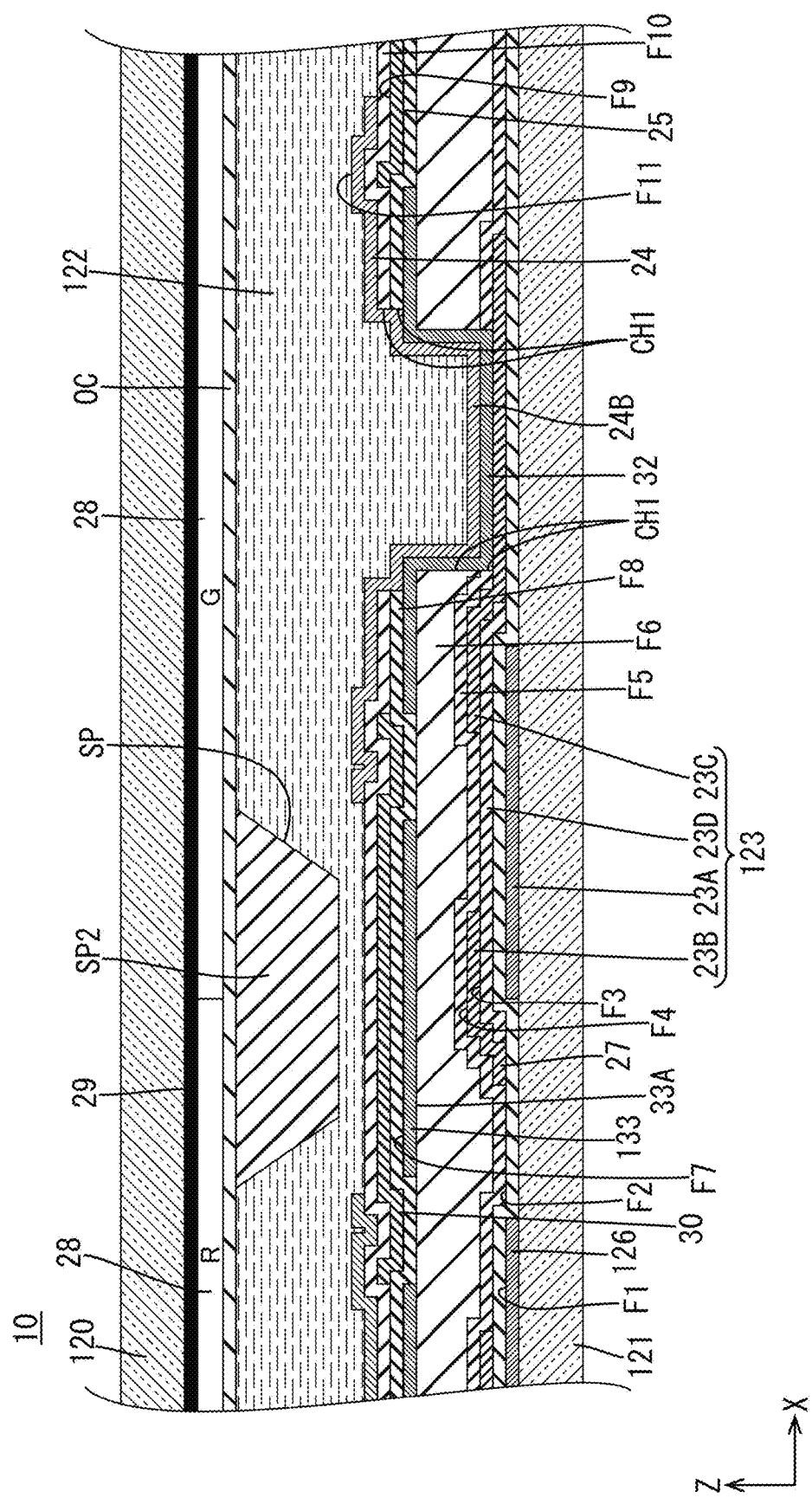
FIG. 21 is a cross-sectional view of the liquid crystal panel along line F-F in FIG. 20.

As illustrated in FIGS. 19 and 20, the connection lines 133 have sections having a large width and the sections are defined as connection line wide sections 33A. FIGS. 19 and 20 are plan views illustrating patterns of the third metal film F7 included in an array substrate 121, although the scale and the positions differ between FIG. 19 and FIG. 20. The third metal film F7 is illustrated with shading in FIGS. 19 and 20. The connection line wide sections 33A are portions of the connection lines 133 overlapping the spacers SP. The connection line wide sections 33A are wider than other sections of the connection lines 133 that do not overlap the spacers SP. The connection line wide sections 33A project in the X-axis direction from two side edges of the other sections of the connection lines 133. The connection line wide sections 33A are intersections of the connection lines 133 and the gate lines 126. The side edges of the connection line wide sections 33A that are opposite TFTs 123 are inclined with respect to the X-axis direction and the Y-axis direction. The connection line wide sections 33A have about a same plan-view shape as that of wide sections 134B. Overlapping areas of the connection lines 133 overlapping the spacers SP are about same as overlapping areas of the short-circuit lines 134 overlapping the spacers SP. Therefore, as illustrated in FIG. 21, the spacers SP can be stably received by the inner surface-side components of the array substrate 121 and the thickness of a liquid crystal layer 122 can be stably maintained. FIG. 21 is a cross-sectional view along line F-F in FIG. 20. As illustrated in FIG. 20, similar to the connection lines 133, touch lines 131 have sections having a large width and the sections are defined as touch line wide sections 31A (position detection line wide sections). The touch line wide sections 31A are portions of the touch lines 131 overlapping the spacers SP. The touch line wide sections 31A are wider than other sections of the touch lines 131 that do not overlap the spacers SP. The touch line wide sections 31A have about a same plan-view shape as that of wide sections 134B and the connection line wide sections 33A and similar functions and advantageous effects of the connection line wide sections 33A are obtained.

As described above, according to this embodiment, a CF substrate 120 includes the spacers SP for maintaining the gap between the CF substrate 120 and the array substrate 121. The connection lines 133 include the connection line wide sections 33A that overlap the spacers SP. According to such a configuration, the gap between the array substrate 121 and the CF substrate 120 can be maintained by the spacers SP. Since the connection lines 133 include the connection line wide sections 33A that have a large width and overlap the spacers SP, large overlapping areas of the connection lines 133 overlapping the spacers SP are obtained compared to connection lines without including the wide sections. Therefore, the spacers SP can be stably received by the array substrate 121 and the gap between the array substrate 121 and the CF substrate 120 can be stably maintained.

Third Embodiment

A third embodiment will be described with reference to FIGS. 22 to 24. The third embodiment includes island-shaped spacer overlapping sections 38 in addition to the configuration of the second embodiment. Configuration, functions, and effects similar to those of the second embodiment may not be described.

Figure 22:
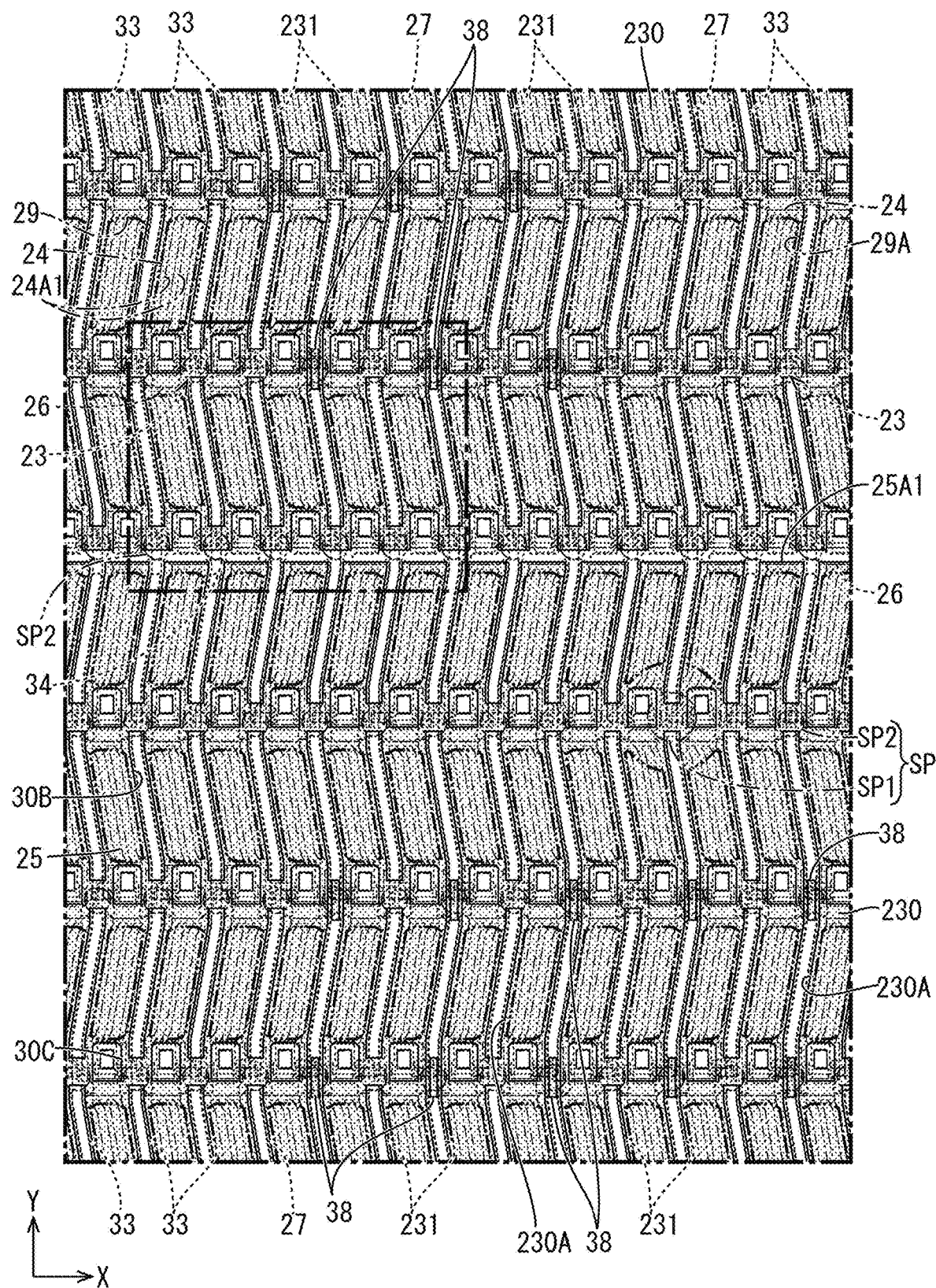
FIG. 22 is a plan view illustrating a portion of the array substrate with a pattern of the first transparent electrode film according to the second embodiment.
Figure 23:
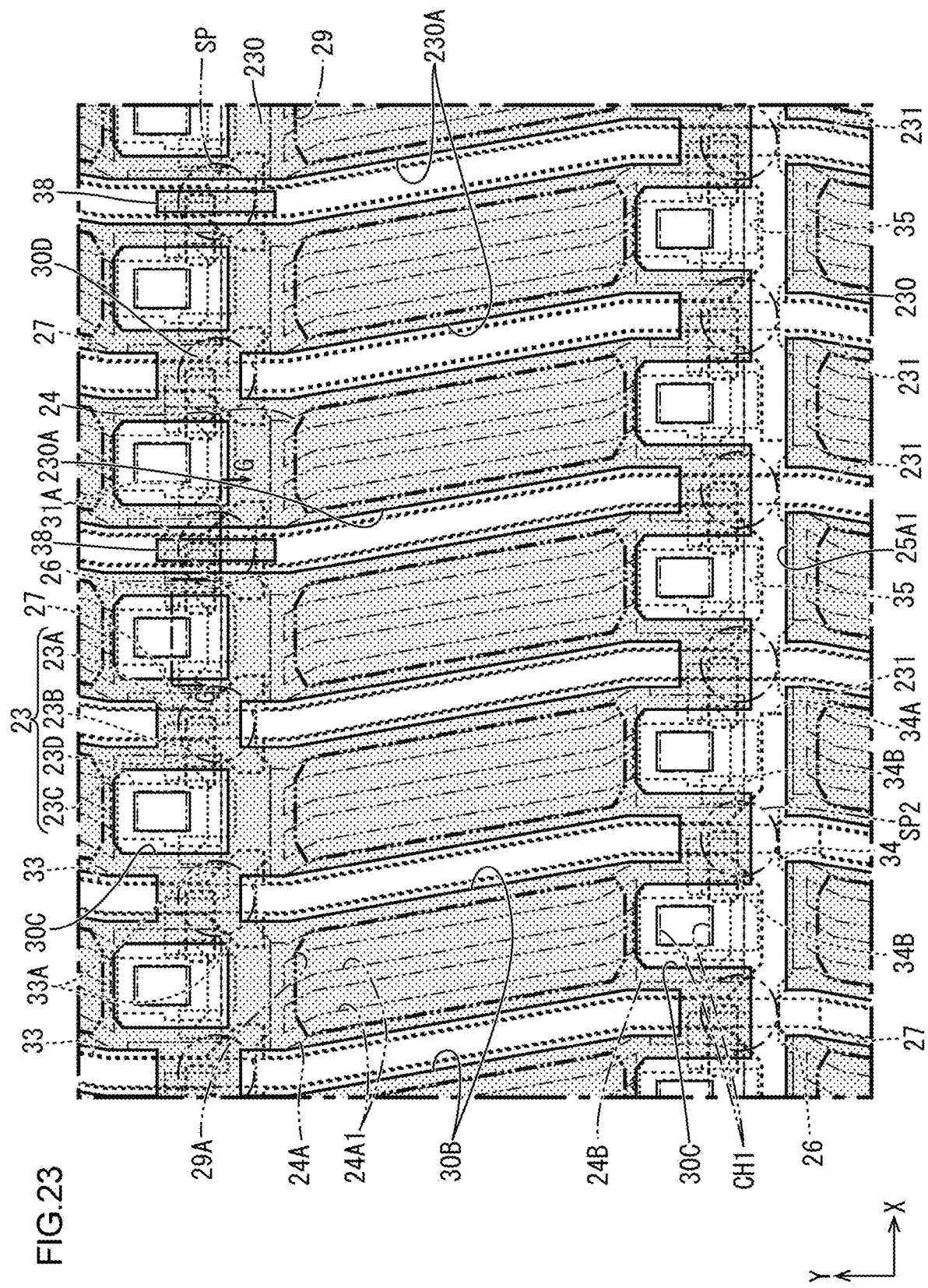
FIG. 23 is a plan view illustrating a portion of the array substrate with a pattern of the first transparent electrode film.
Figure 24:
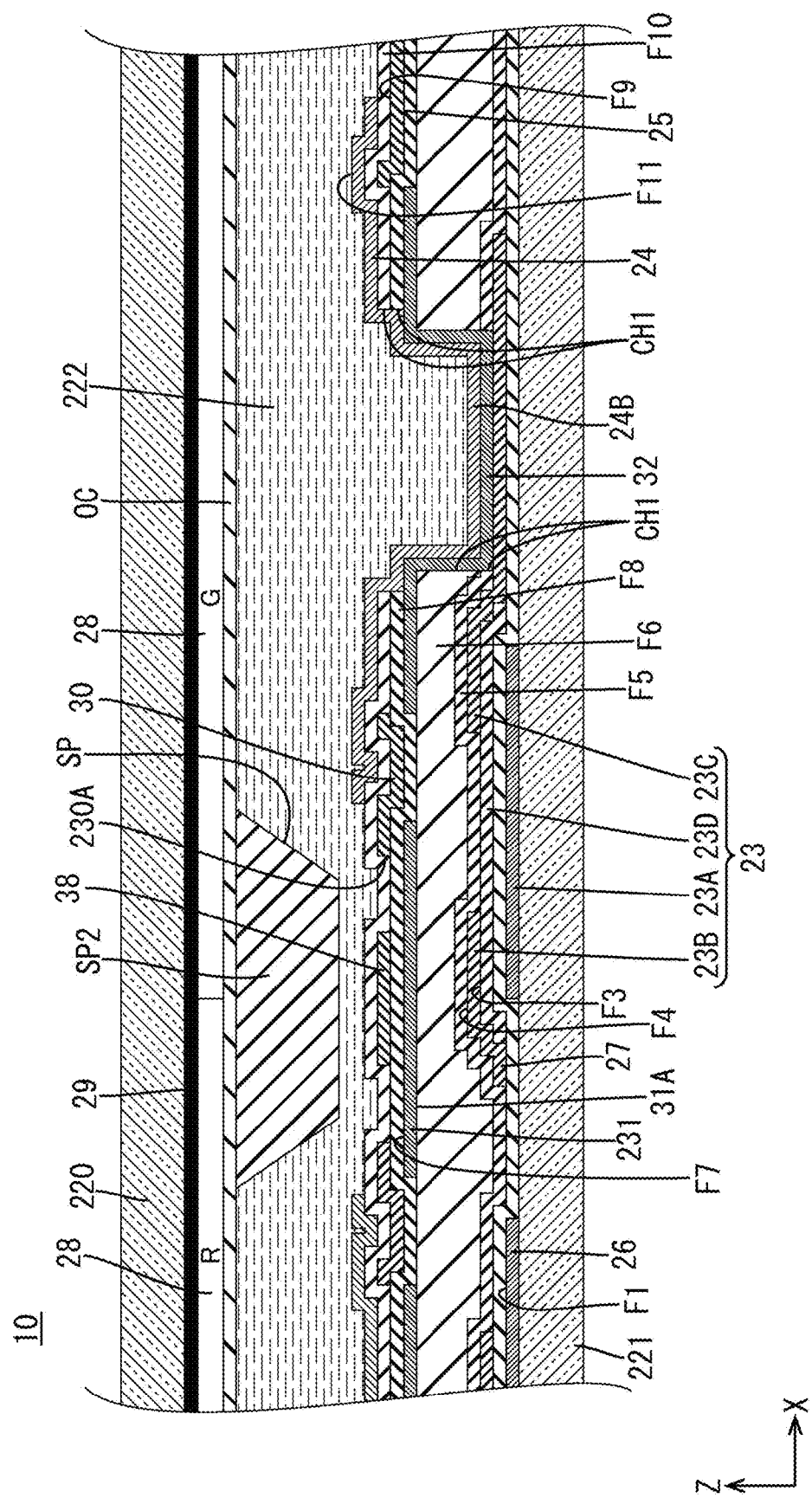
FIG. 24 is a cross-sectional view of the liquid crystal panel along line G-G in FIG. 23.

As illustrated in FIGS. 22 and 23, an array substrate 221 according to this embodiment includes the island-shaped spacer overlapping sections 38. The island-shaped spacer overlapping sections 38 are disposed within first openings 230A that overlap touch lines 231 in the touch electrodes 230. Each of the island-shaped spacer overlapping sections 38 is between opening edges of the first opening 230A. FIGS. 22 and 23 are plan views illustrating patterns of the third first transparent electrode film F9 included in the array substrate 221, although the scale and the positions differ between FIG. 12 and FIG. 23. The first transparent electrode film F9 is illustrated with shading in FIGS. 22 and 23. Specifically, some of the first openings 230A in the touch electrode 230 overlap and cross the spacers SP. The island-shaped spacer overlapping sections 38 are disposed within the first openings 230A crossing the spacers SP. The island-shaped spacer overlapping section 38 is disposed between the opening edges of the first opening 230A that crosses the spacer SP. The island-shaped spacer overlapping sections 38 extend along the Y-axis direction and have a vertically long rectangular plan view shape. The island-shaped spacer overlapping sections 38 overlap and cross the spacers SP and are portions of the first transparent electrode film F9. The touch electrodes 230 are also portions of the first transparent electrode film F9. According to such a configuration, as illustrated in FIG. 24, the island-shaped spacer overlapping sections 38 improves planarization of the inner-surface side components of the array substrate 221 compared to the configuration of the first embodiment without including the island-shaped spacer overlapping sections 38. The spacers SP can be received by the inner-surface side components of the array substrate 221 stably. This stably keeps the thickness of a liquid crystal layer 222. FIG. 24 is a cross-sectional view along line G-G in FIG. 23.

As described above, according to this embodiment, the CF substrate 220 includes the spacers SP that keep the gap between the CF substrate 220 and the array substrate 221. The spacers SP overlap portions of the touch lines 231. The touch electrodes 230 include the first openings 230A that extend along the first direction and overlap the touch lines 231 and the spacers SP. Some of the first openings 230A extend to cross the spacers SP. The island-shaped spacer overlapping sections 38 are provided within the first openings 230A crossing the spacers SP in the touch electrodes 230. The island-shaped spacer overlapping sections 38 are between the opening edges of the first openings 230A and overlap and cross the spacers SP. The island-shaped spacer overlapping sections 38 and the touch electrodes 230 are portions of the first transparent electrode film F9. This keeps the gap between the array substrate 221 and the CF substrate 220 by the spacers SP. The overlapping area of the touch electrode 230 overlapping the touch lines 231 is decreased by forming the first openings 230A extending along the first direction. Furthermore, since the first openings 230A include some first openings 230A overlapping the touch lines 231 and crossing the spacers SP, the opening areas of the first openings 230A is increased compared to a configuration in which the first openings do not cross the spacers SP. This further reduces parasitic capacitances that may be created between the touch electrode 230 and the touch lines 231 that are connected to other touch electrode 230. Furthermore, the island-shaped spacer overlapping sections 38, which are portions of the same conductive film as the touch electrodes 230, are disposed between the opening edges of the first openings 230A that cross the spacers SP and the island-shaped spacer overlapping sections 38 are disposed to cross the spacers SP. Therefore, the array substrate 221 can stably receive the spacers SP compared to the configuration without including the island-shaped spacer overlapping sections 38. Thus, the gap between the array substrate 221 and the CF substrate 220 can be stably maintained.

Other Embodiments

The technology described herein is not limited to the embodiments described above and illustrated by the drawings. For example, the following embodiments will be included in the technical scope of the present technology.

(1) Some of the connection lines 33, 133 may not be connected to the short-circuit lines 34, 134. Namely, all of the connection lines 33, 133 may not be necessarily connected to the short-circuit lines 34, 134. The connection line 33, 133 that is not connected to the short-circuit line 34, 134 may be disposed between two touch lines 31, 131, 231 with respect to the X-axis direction.

(2) The short-circuit lines 34, 134 may be connected to the touch electrodes 20, 230. The short-circuit lines 34, 134 short-circuiting the connection lines 33, 133 for the target touch electrode 30, 230 may be connected to the touch lines 31, 131, 231 that are connected to the target touch electrode 30, 230.

(3) The overlapping lines 36 may be connected to the touch electrodes 30, 230. The overlapping line short-circuit sections 37 may not be provided and the overlapping lines 36 may not be connected to the connection lines 33, 133. The overlapping lines 36 are connected to the connection lines 33, 133 via the overlapping line short-circuit sections 37 but may not be connected to the short-circuit lines 34, 134.

(4) The touch lines 31, 131, 231 may include the extended portions 34A. The short-circuit lines 34, 134 and the touch lines 31, 131, 231 may include the extended portions 34A. The extended portions 34A may not be provided.

(5) The short-circuit lines 34, 134 and the connection lines 33, 133 may be portions of different metal films.

(6) The short-circuit sections 35 and the touch lines 31, 131, 231 may be portions of different metal films.

(7) The metal film that includes the portions of the overlapping line short-circuit sections 37 may differ from the metal film that includes the portions of the overlapping lines 36 and the connection lines 33, 133.

(8) The areas and the plan-view shape of the wide sections 34B, 134B and the connection line wide sections 33A may be altered as appropriate.

(9) The connection lines 33, 133 may be portions of the first metal film F1. In such a configuration, the connection lines 33, 133 have a length measured in the Y-axis direction that is about same as the long-side dimension of the pixel electrodes 24 to prevent short-circuits between the connection lines 33, 133 and the gate lines 26, 126. If the connection lines 33, 133 are configured to extend and cross the gate lines 26, 126, only the portions of the connection lines 33, 133 crossing and overlapping the gate lines 26, 126 may be portions of the third metal film F7.

(10) The specific plan-view routing of the gate lines 26, 126, the source lines 27, the touch lines 31, 131, 231, the connection lines 33, 133, the short-circuit lines 34, 134, and the overlapping lines 36 may be altered as appropriate. For example, the source lines 27, the touch lines 31, 131, 231, and the connection lines 33, 133 may extend straight along the Y-axis direction. The gate lines 26, 126 and the short-circuit lines 34, 134 may extend in a zig-zag manner and substantially along the X-axis direction. When the routing of the lines is altered, the plan-view shapes of the extended sections 34A, the short-circuit sections 35, the overlapping line short-circuit sections 37, and the island-shaped spacer overlapping sections 39 may be altered as appropriate.

(11) Some of the touch electrodes 30, 230 may not be connected to the connection lines 33, 133. For example, among the touch electrodes 30, 230 included in the touch electrode column, some touch electrodes 30, 230 that are closer to the drivers 11 than other touch electrodes 30, 230 may not be connected to the connection lines 33, 133 because the touch lines 31, 131, 231 connected to the touch electrodes 30, 230 that are closer to the drivers 11 have lower electrical resistances. In such a configuration, the touch lines 31, 131, 231 may be disposed to overlap all of the source lines 27 that overlap the touch electrodes 30, 230 that are closer to the drivers 11.

(12) The number of touch lines 31, 131, 231 connected to the touch electrodes 30, 230 included in the touch electrode column may differ from each other. For example, the number of touch lines 31, 131, 231 connected to each of the touch electrodes 30, 230 included in the touch electrode column may increase as the touch electrode 30, 230 is farther away from the driver 11 with respect to the Y-axis direction.

(13) The specific two-dimensional arrangement and the specific number of the first openings 30A, 230A and the spacer overlapping sections 30D may be altered from those in the drawings as appropriate.

(14) One touch line 31, 131, 231 or three or more touch lines 31, 131, 231 may be connected to one touch electrode 30, 230.

(15) The touch lines 31, 131, 231 may be disposed near the edge of the touch electrodes 30, 230 with respect to the X-axis direction.

(16) All the touch lines 31, 131, 231 may extend to the touch electrodes 30, 230 that are farthest from the driver 11.

(17) The TFTs 23, 123 may be arranged in a zig-zag manner. Namely, the TFTs 23, 123 connected to the pixel electrodes 24 that are on one side with respect to the target source line 27 to be connected in the X-axis direction and the TFTs 23, 123 connected to the pixel electrodes 24 that are on another side with respect to the target source line 27 to be connected in the X-axis direction are arranged alternately with respect to the Y-axis direction.

(18) The spacers SP may have a square columnar shape that is tapered toward the array substrate 21, 121, 221. The side surfaces of the spacers SP are not necessarily tapered but may be straight such that the spacers SP have a constant diameter.

(19) The specific two-dimensional arrangement, the specific number, and the specific plan-view shape of the first spacers SP1 and the second spacers SP2 of the spacers SP may be altered from the ones in the drawings as appropriate.

(20) The number of the drivers 11 and the flexible substrates 12 may be altered as appropriate.

(21) The drivers 11 may be mounted on the flexible substrate 12 with chip on film (COF).

(22) Instead of the gate circuits 13, gate drivers having the similar function as the gate circuits 13 may be mounted on the array substrate 21, 121, 221.

(23) The specific plan-view shape of the slits 24A1 in the pixel electrodes 24 may be altered as appropriate and may be a W-shape or a straight linear shape. The specific number of the slits 24A1 and the specific interval between the slits 24A1 may be altered as appropriate.

(24) The common electrode 25 and the touch electrodes 20, 230 may be portions of the second transparent electrode film F11 and the pixel electrodes 24 may be portions of the first transparent electrode film F9. In such a configuration, the pixel electrodes 24 may not include the slits 24A1 and the common electrode 25 and the touch electrodes 30, 230 may include slits.

(25) An electrical resistance of portions of the semiconductor film F3 may be decreased to provide low resistance sections. The source electrodes 23B and the drain electrodes 23C of the TFTs 23, 123 can be provided with the low resistance sections. Further, the pixel electrodes 24 can be provided with the low resistance sections. With the configuration including the low resistance sections as the pixel electrodes 24, the first transparent electrode film F9 or the second transparent electrode film F11 may be omitted.

(26) The TFTs 23, 123 may not be arranged in a zig-zag manner but may be arranged in a matrix with respect to the X-axis direction and the Y-axis direction.

(27) The semiconductor film F3 may be made of polysilicon (LTPS).

(28) The display mode of the liquid crystal panel 10 may be the IPS mode.

(29) The touch panel pattern may use a mutual-capacitance method other than the self-capacitance method.

(30) The plan-view shape of the liquid crystal panel 10 may be a vertically-long rectangular shape, a square shape, a circular shape, a semicircular shape, an oval shape, and a trapezoidal shape.

(31) The liquid crystal panel 10 may be a reflective liquid crystal panel or a semitransmissive liquid crystal panel other than the transmissive liquid crystal panel.

(32) Display panels other than the liquid crystal panel 10 (such as organic electro luminescence display panels and microcapsule-based electrophoretic display (EPD) panels) may be used.

The invention claimed is:

1. A wiring board comprising:
position detection lines extending along a first direction and transmitting at least position detection signals;
position detection electrodes arranged at intervals with respect to the first direction and connected to the position detection lines;
a line disposed between the position detection electrodes that are adjacent to each other with respect to the first direction, the line extending in a second direction that crosses the first direction;
connection lines extending along the first direction and being connected to the position detection electrodes, the connection lines being arranged at intervals with respect to the second direction; and
a short-circuit line extending along the second direction and overlapping the line via an insulating film and being connected to the connection lines.

2. The wiring board according to claim 1, wherein
the position detection lines are arranged away from the connection lines with respect to the second direction,
the connection lines include a first connection line that is adjacent to the position detection lines,
the short-circuit line includes an extended section that extends from a connection portion of the short-circuit line that is connected to the first connection line toward the position detection lines along the second direction, and
the extended section overlaps the line via an insulating film.

3. The wiring board according to claim 1, wherein
at least two position detection lines out of the position detection lines are connected to a first position detection electrode of the position detection electrodes, and
the wiring board further comprises a short-circuit section connecting the at least two position detection lines, the short-circuit section overlapping the line via the insulating film.

4. The wiring board according to claim 1, wherein
the position detection electrodes that are arranged at intervals with respect to the first direction are defined as a column of position detection electrodes, and
the position detection lines that are connected to the position detection electrodes included in the column are arranged at intervals with respect to the second direction such that no connection line is disposed between the position detection lines that are connected to the position detection electrodes included in the column.

5. The wiring board according to claim 4, wherein
at least two position detection lines out of the position detection lines are connected to a first position detection electrode of the position detection electrodes, and
the connection lines that are connected to each other via the short-circuit line are disposed between the at least two position detection lines and an edge of the first position detection electrode that extends along the first direction.

6. The wiring board according to claim 1, wherein
the position detection electrodes that are arranged at intervals with respect to the first direction are defined as a column of position detection electrodes,
the column of position detection electrodes includes columns of position detection electrodes and the columns of position detection electrodes are arranged at intervals with respect to the second direction, and
the wiring board further comprises:
a first line extending along the first direction and disposed between the position electrodes that are adjacent to each other with respect to the second direction; and
an overlapping line extending along the first direction and overlapping the first line via the insulating film, the overlapping line being connected to the short-circuit line.

7. The wiring board according to claim 6, wherein
the connection lines include a second connection line that is adjacent to and spaced from the overlapping line, and
the wiring board further comprises an overlapping line short-circuit section that connects the second connection line and the overlapping line.

8. The wiring board according to claim 1, wherein
at least two position detection lines out of the position detection lines are connected to a first position detection electrode of the position detection electrodes, the short-circuit line is not connected to the at least two position detection lines and is connected to the connection lines that are connected to the first position detection electrode.

9. The wiring board according to claim 1, wherein the short-circuit line and the connection lines are portions of a same conductive film.

10. The wiring board according to claim 1, further comprising a signal supply section disposed on one end side with respect to a column of position detection electrodes including the position detection electrodes that are arranged at intervals with respect to the first direction, the signal supply section being for supplying position detection signals to the position detection lines, wherein
the short-circuit line includes short-circuit lines and the short-circuit lines and the position detection electrodes are alternately arranged with respect to the first direction, and
a number of the connection lines connected to each of the short-circuit lines increases as positions of the short-circuit lines are farther away from the signal supply section with respect to the first direction.

11. A display device comprising:
the wiring board according to claim 1; and
an opposed substrate opposed to the wiring board with a gap, wherein
the wiring board further includes pixel electrodes, and switching components that are connected to the pixel electrodes and the line.

12. The display device according to claim 11, wherein
the opposed substrate includes a spacer that keeps the gap between the opposed substrate and the wiring board, and
the short-circuit line includes a wide section that has an increased width and overlaps the spacer.

13. The display device according to claim 11, wherein
the opposed substrate includes spacers that keep the gap between the opposed substrate and the wiring board, and
the connection lines include connection line wide sections that have an increased width and overlap the spacers, respectively.

14. The display device according to claim 11, wherein
the opposed substrate includes spacers that keep the gap between the opposed substrate and the wiring board,
the position detection lines overlap the spacers, respectively,
the position detection electrodes include openings that extend along the first direction and overlap the position detection lines, respectively, but do not cross the spacers, and
the position detection electrodes include spacer overlapping sections that overlap the spacers.

15. The display device according to claim 11, wherein
the opposed substrate includes spacers that keep the gap between the opposed substrate and the wiring board,
the position detection lines overlap the spacers, respectively,
the position detection electrodes include openings that extend along the first direction and overlap the position detection lines, respectively, and cross the spacers,
the wiring board further includes island-shaped spacer overlapping sections that are within the openings, respectively, and cross the spacers, respectively, and
the island-shaped spacer overlapping sections and the position detection electrodes are portions of a same conductive film.

* * * * *